United States Patent [19]
Minami et al.

[11] Patent Number: 5,462,021
[45] Date of Patent: Oct. 31, 1995

[54] HYDROGEN GAS SUPPLY SYSTEMS FOR HYDROGEN ENGINE AND METHOD OF SUPPLYING HYDROGEN GAS TO THE HYDROGEN GAS SUPPLY SYSTEM

[75] Inventors: Takanori Minami; Noriaki Shiraishi; Tsutomu Shimizu; Kenji Takamuku; Yoshinori Tsushio; Yoshio Mizushima; Kazuyuki Yoshimoto; Masaki Kadokura, all of Hiroshima, Japan

[73] Assignee: Mazda Motor Corporation, Hiroshima, Japan

[21] Appl. No.: 270,305

[22] Filed: Jul. 5, 1994

Related U.S. Application Data

[63] Continuation of Ser. No. 29,067, Mar. 10, 1993, abandoned.

[30] Foreign Application Priority Data

Mar. 12, 1992 [JP] Japan .................................. 4-090012
May 15, 1992 [JP] Japan .................................. 4-148526

[51] Int. Cl.⁶ .................................................. F02B 43/08
[52] U.S. Cl. ...................... 123/3; 123/DIG. 12; 220/562; 220/581
[58] Field of Search ............................ 123/3, DIG. 12, 123/527; 220/562, 581

[56] References Cited

U.S. PATENT DOCUMENTS

| | | | |
|---|---|---|---|
| 4,548,044 | 10/1985 | Sakai et al. | 123/DIG. 12 |
| 5,092,281 | 3/1992 | Iwaki et al. | 123/DIG. 12 |

FOREIGN PATENT DOCUMENTS

| | | |
|---|---|---|
| 891746 | 4/1982 | Belgium . |
| 2275725 | 1/1976 | France . |
| 2458741 | 1/1981 | France . |
| 58-170999 | 10/1983 | Japan . |
| 62-279264 | 12/1987 | Japan . |
| 63-125898 | 5/1988 | Japan . |
| 63-125897 | 5/1988 | Japan . |
| 1197301 | 8/1989 | Japan . |
| 1216024 | 8/1989 | Japan . |
| 1216062 | 8/1989 | Japan .............................. 123/DIG. 12 |
| 5-18260 | 1/1993 | Japan .............................. 123/DIG. 12 |
| 5-18259 | 1/1993 | Japan .............................. 123/DIG. 12 |
| 0848730 | 7/1981 | U.S.S.R. ......................... 123/DIG. 12 |

OTHER PUBLICATIONS

Automotive Engineering, vol. 86, No. 5, May 1978, Dallas, Tex., US, pp. 78–81, D. Scott, "Hydrogen Fuel Ready For Bus Fleet".
International Journal of Hydrogen Energy, vol. 11, No. 1, 1986, Oxford, GB, pp. 39–42, Davidson, "Development of a Hydrogen–Fuelled Farm Tractor".
Automotive Engineering, vol. 92, No. 9, 1984, Dallas, Tex., US, pp. 36–40, "Hydrogen Fuel Reduces Mining Machinery Emissions".

*Primary Examiner*—Henry C. Yuen
*Assistant Examiner*—Erick Solis
*Attorney, Agent, or Firm*—Sixbey, Friedman, Leedom & Ferguson; Gerald J. Ferguson, Jr.; Donald R. Studebaker

[57] ABSTRACT

A hydrogen gas supply system for a hydrogen engine has a hydrogen gas cartridge which is detachably attached to the engine. The cartridge has a casing in which hydrogen gas storage alloy and a heating medium passage for heating the hydrogen gas storage alloy are housed. The engine is provided with a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned. The hydrogen gas cartridge is provided with a hydrogen gas takeout port, a heating medium inlet and a heating medium outlet. The hydrogen gas takeout port, the heating medium inlet and the heating medium outlet are respectively connected to and disconnected from the hydrogen gas supply passage, the heating medium supply passage and the heating medium return passage in response to attachment and detachment of the hydrogen gas cartridge.

23 Claims, 19 Drawing Sheets

5,462,021

HYDROGEN GAS SUPPLY SYSTEMS FOR HYDROGEN ENGINE AND METHOD OF SUPPLYING HYDROGEN GAS TO THE HYDROGEN GAS SUPPLY SYSTEM

This application is a continuation of Ser. No. 029,067, filed Mar. 10, 1993, now abandoned.

BACKGROUND OF THE INVENTION

1. Field of the Invention

This invention relates to a hydrogen gas supply system for a hydrogen engine and a method of supplying hydrogen gas to the hydrogen gas supply system.

2. Description of the Prior Art

Recently a so-called hydrogen engine has attracted special interest as a clean engine which emits only water. (For example, see Japanese Unexamined Patent Publication No. 62(1987)-279264.)

However there remain various problems to be overcome in order to put such a hydrogen engine into practical use.

For example, since hydrogen gas is generally distributed in a high pressure vessel and the fill quantity per volume is small, the transportation cost becomes high and the price becomes higher than gasoline which can be transported in a liquid state.

Further in the case of a vehicle having a limited space, the quantity of hydrogen gas which can be carried by the vehicle is limited and accordingly the vehicle must be frequently replenished with hydrogen gas. However in the present condition, facilities for replenishing hydrogen gas are not enough, which obstructs popularization of the hydrogen engines.

SUMMARY OF THE INVENTION

In view of the foregoing observations and description, the primary object of the present invention is to overcome the aforesaid difficulties in replenishing the hydrogen engine with hydrogen gas, thereby facilitating popularization of the hydrogen engines.

In accordance with one aspect of the present invention, there is provided a hydrogen gas supply system for a hydrogen engine having a hydrogen gas cartridge which is detachably attached to the engine. The cartridge has a casing in which hydrogen gas storage alloy and a heating medium passage for heating the hydrogen gas storage alloy are housed. The engine is provided with a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned. The hydrogen gas cartridge is provided with a hydrogen gas takeout port, a heating medium inlet and a heating medium outlet. The hydrogen gas takeout port, the heating medium inlet and the heating medium outlet are respectively connected to and disconnected from the hydrogen gas supply passage, the heating medium supply passage and the heating medium return passage in response to attachment and detachment of the hydrogen gas cartridge.

Generally engine coolant is used as the heating medium.

It is preferred that a plurality of hydrogen gas cartridges which are light in weight and not heavier than 20 Kgf are detachably attached to the engine. In such a case, though the hydrogen gas takeout ports of the respective cartridges may be connected either in parallel or in series, it is preferred that the heating medium passages in the respective cartridges be connected in series so that the heating medium is supplied uniformly to all the cartridges. That is, when the heating medium passages are connected in parallel, a problem that the engine coolant cannot be uniformly distributed to all the cartridges can arise due to stagnancy of the engine coolant at particular portions. When the engine coolant is not uniformly distributed to the fuel cartridges, the hydrogen gas stored in the fuel cartridges is unevenly consumed.

In the hydrogen gas supply system of the present invention, since the hydrogen gas cartridges are removably attached to the hydrogen gas supply passage, the engine can be replenished with hydrogen gas easily and quickly only by replacing the exhausted fuel cartridges with new fuel cartridges full of hydrogen gas.

Further since the hydrogen gas stored in the hydrogen storage alloy cannot be discharged unless it is heated, the fuel cartridges can be handled in the same manner as general freight and can be transported and stored without use of specialized facilities unlike the case where hydrogen gas is transported in the liquid state or the gas state. Further when stored in the hydrogen storage alloy, more hydrogen gas can be stored per volume as compared with the case where hydrogen gas is stored in the gas state. Thus the transportation cost is lowered and hydrogen gas can be supplied at lower cost.

In accordance with another aspect of the present invention, there is provided a method of supplying hydrogen gas to a hydrogen gas supply system for a hydrogen engine characterized by the steps of storing hydrogen gas produced at a hydrogen gas plant in a hydrogen gas storage alloy, transporting the hydrogen gas as it is stored in the hydrogen gas storage alloy and supplying the hydrogen gas to the hydrogen gas supply system as it is stored in the hydrogen gas storage alloy.

DESCRIPTION OF THE PREFERRED EMBODIMENT

Figure 1:
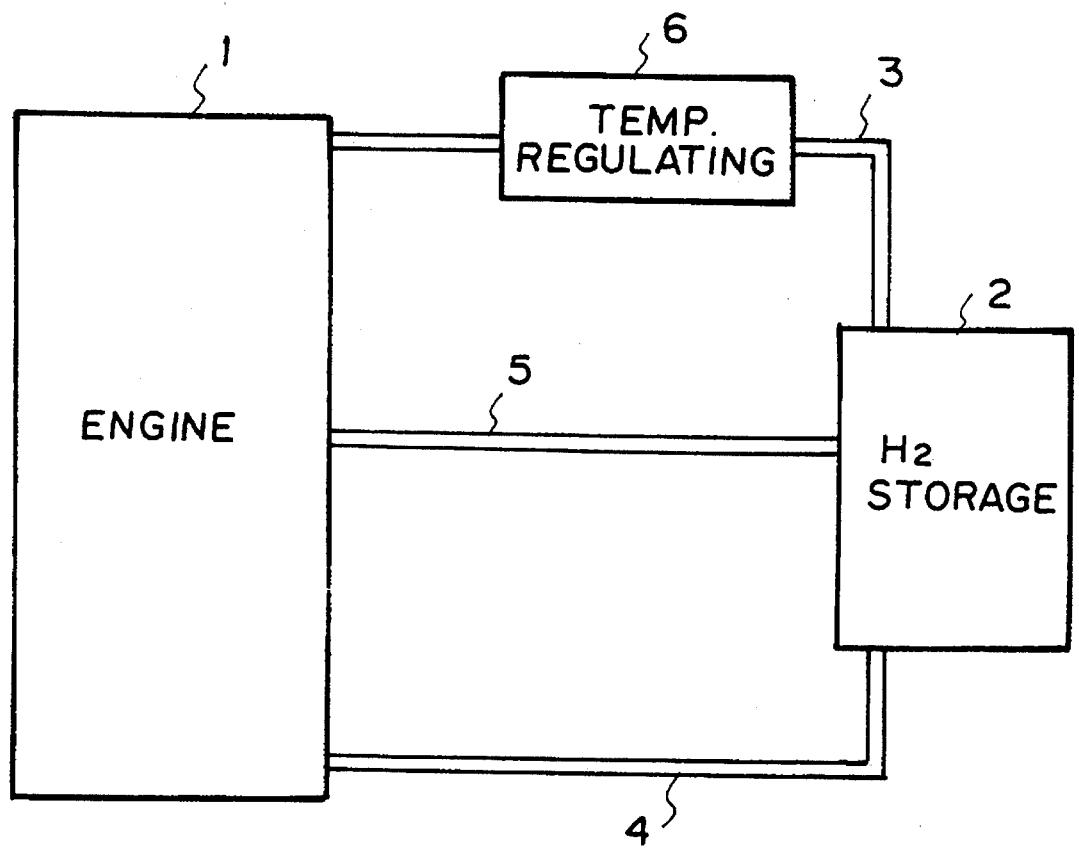
FIG. 1 is a schematic view showing a hydrogen gas supply system in accordance with a first embodiment of the present invention.

In FIG. 1, a hydrogen gas supply system in accordance with an embodiment of the present invention which is for supplying a hydrogen engine 1 with hydrogen gas has a hydrogen gas storage portion 2. An engine coolant supply passage 3 which leads engine coolant discharged from the engine 1 to the hydrogen gas storage portion 2, a return passage 4 for returning the engine coolant to the engine 1 and a hydrogen gas supply passage 5 which leads hydrogen gas from the hydrogen gas storage portion 2 to the engine 1 are provided between the engine 1 and the hydrogen gas storage portion 2. The engine coolant supply passage 3 is provided with a temperature regulating portion 6 which regulates the temperature of the engine coolant to be introduced into the hydrogen gas storage portion 2.

Figure 2:
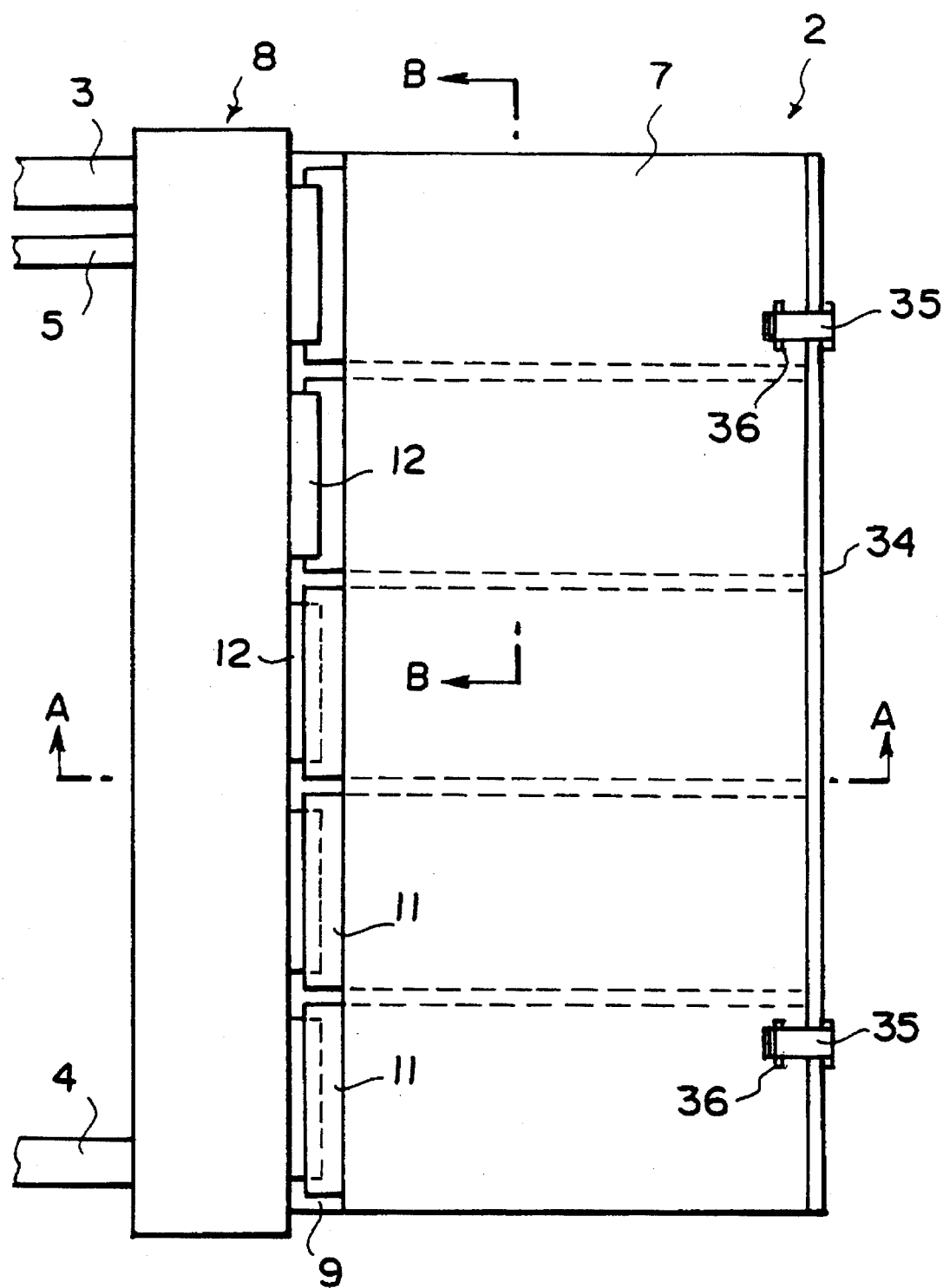
FIG. 2 is a schematic plan view showing the hydrogen gas storage portion of the first embodiment.
Figure 3:
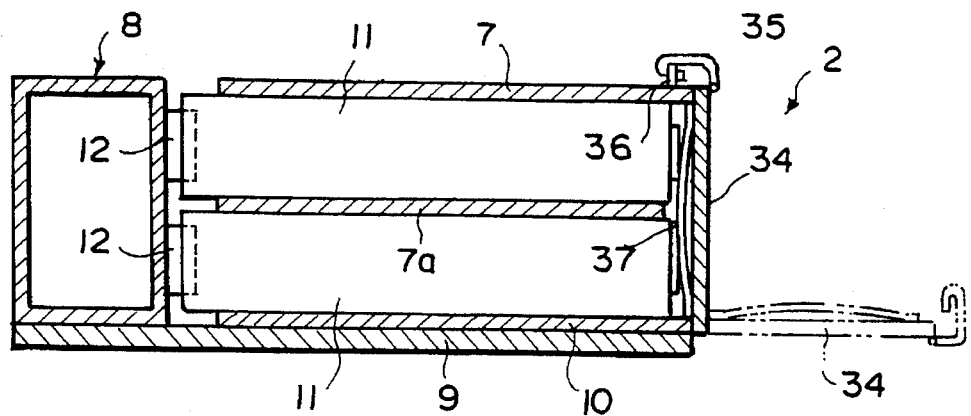
FIG. 3 is a cross-sectional view taken along line A—A in FIG. 2.
Figure 4:
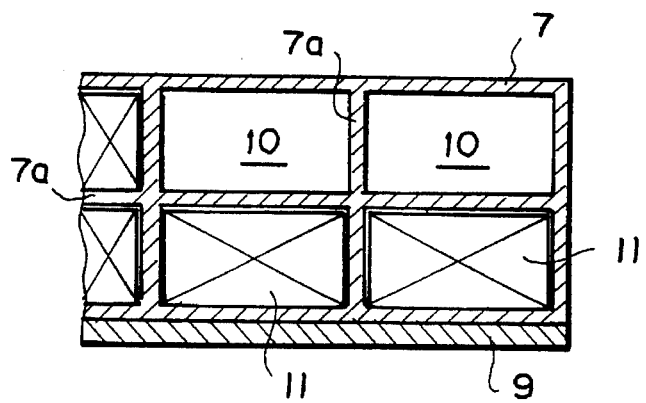
FIG. 4 is a cross-sectional view taken along line B—B in FIG. 2.

As shown in FIGS. 2 to 4, the hydrogen gas storage portion 2 comprises a cartridge casing 7 which opens at front and rear ends and a connection unit 8 which is opposed to the cartridge casing 7 in front of the same. The connection unit 8 and the cartridge casing 7 are integrally connected with each other by a connecting plate 9. The interior of the cartridge casing 7 is divided by a plurality of partition walls 7a into a plurality of cartridge loading portions 10, and a fuel cartridge 11 is inserted into each of the cartridge loading portions 10.

A plurality of joint portions 12 are provided in the connection unit 8 to project toward the cartridge casing 7 opposed to the respective cartridge loading portions 10. The engine coolant supply passage 3, the return passage 4 and the hydrogen gas supply passage 5 are connected to the connection unit 8.

Figure 5:
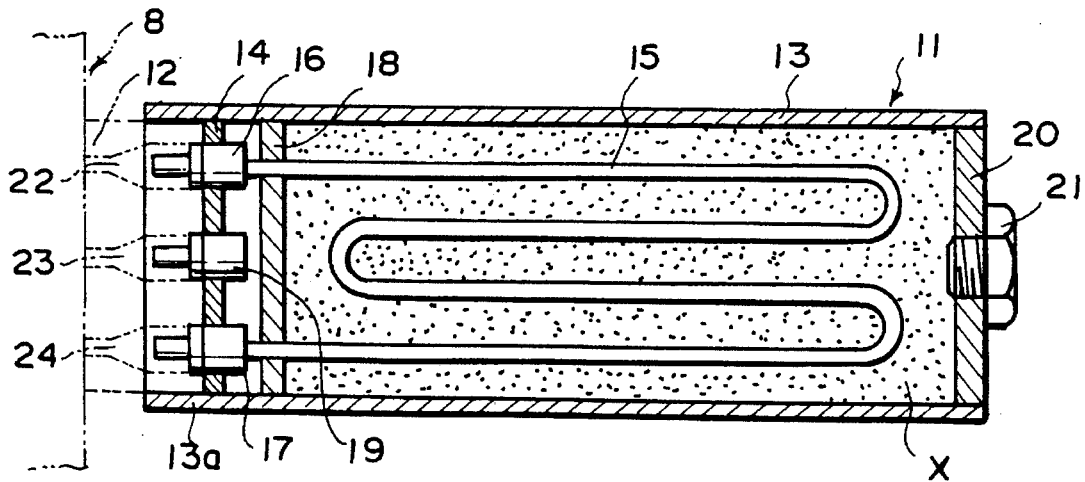
FIG. 5 is a vertical cross-sectional view showing the fuel cartridge employed in the first embodiment.

As shown in FIG. 5, each of the fuel cartridges 11 comprises a hollow casing 13 having a front end wall 14 which is recessed rearward. A twisty conduit 15 is disposed in the casing 13 and opposite ends of the conduit 15 is respectively connected to connectors 16 and 17 which extend through the front end wall 14. A filter 18 for filtering hydrogen gas is provided in the casing 13 spaced rearward from the front end wall 14. Another connector 19 extends through the front end wall 14 and the inner end of the connector 19 opens toward the filer 18 between the front end wall 14 and the filter 18.

The casing 13 is provided with a rear end wall 20 and a hydrogen storage alloy X, which may be, for instance, of titanium-manganese alloy, is filled between the rear end wall 20 and the filter 18. The hydrogen storage alloy X can be changed by removing a plug 21 which is screwed into the rear end wall 20. The total weight of the fuel cartridge 11 should not exceed 20 Kgf and preferably is 10 Kgf or so in view of handling ease.

When the fuel cartridge 11 is connected to the connection unit 8, the front end portion 13a of the casing 13, which extends forward beyond the front end wall 14, is fitted on the joint portion 12 of the connection unit 8 and the connectors 16, 17 and 19 are respectively connected to the connectors 22, 23 and 24.

Figure 6:
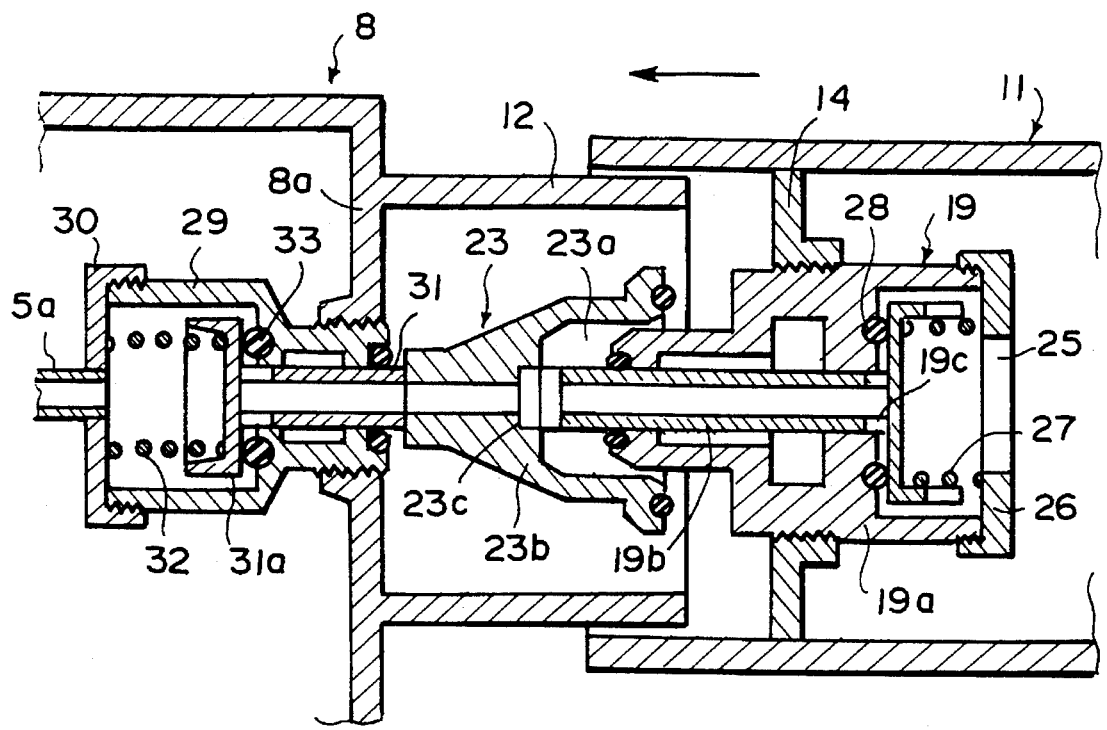
FIG. 6 is an enlarged fragmentary cross-sectional view showing the connection between the fuel cartridge and the connection unit in the first embodiment in the state where the fuel cartridge and the connection unit are disconnected.
Figure 7:
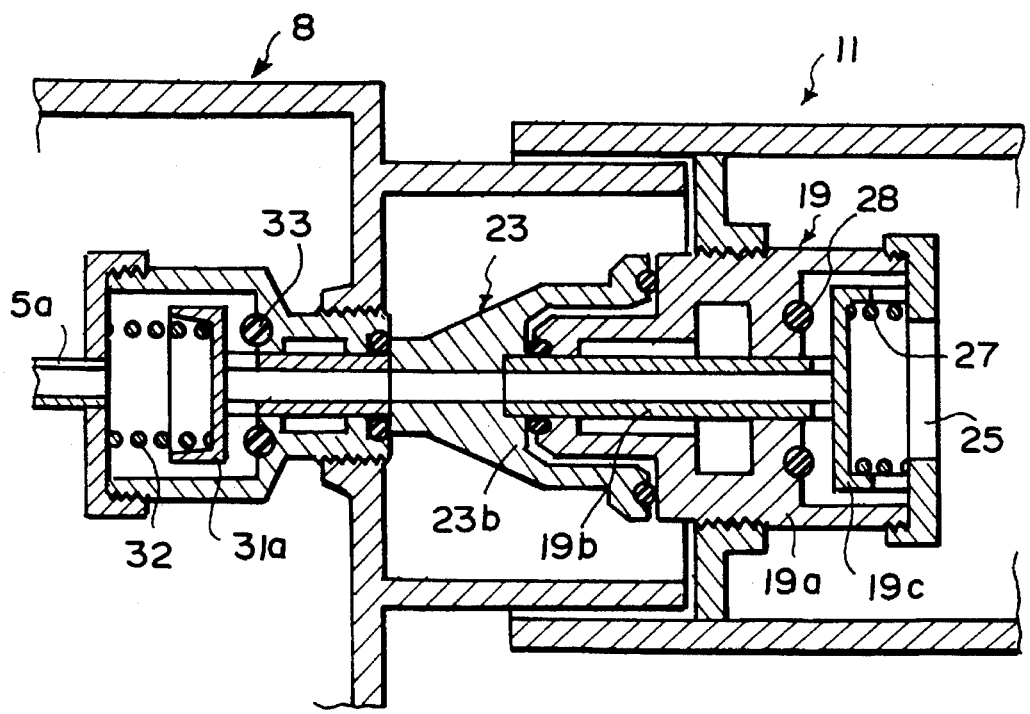
FIG. 7 is an enlarged fragmentary cross-sectional view showing the connection between the fuel cartridge and the connection unit in the first embodiment in the state where the fuel cartridge and the connection unit are connected.

The structure of the connection between the fuel cartridge 11 and the connection unit 8 will be described in more detail with reference to FIGS. 6 and 7 in conjunction with the connection between the connectors 19 and 23 by way of example.

The connector 19 through which hydrogen gas in the fuel cartridge 11 is taken out comprises a connector body 19a which extends through the front end wall 14, an inner tubular member 19b which extends through the connector body 19a and is slidable relative to the same and a spring retainer 26 which is screwed on the rear end of the connector body 19a and is provided with an opening 25. A valve body 19c is formed on the rear end of the inner tubular member 19b and is opposed to an O-ring 28 which is provided in a wall surface in front of the valve body 19c. A return spring 27 is provided between the spring retainer 26 and the valve body 19c and resiliently presses the valve body 19c against the O-ring 28.

A tubular support 29 is screwed into a vertical wall portion 8a of the connection unit 8 at the bottom of the joint portion 12, and a spring retainer 30 is screwed on the rear end of the support 29. A tubular member 31 extends through the support 29 and is slidable relative to the same. A connector body 23b having a recessed portion 23a into which the connector 19 is inserted is fixed to the front end of the tubular member 31. A valve body 31a is formed on the rear end of the tubular member 31 and is opposed to an O-ring 33 which is provided in a wall surface in front of the valve body 31a. A return spring 32 is provided between the spring retainer 30 and the valve body 31a and resiliently presses the valve body 31a against the O-ring 33. A branch passage 5a communicating with the hydrogen gas supply passage 5 is connected to the spring retainer 30.

When the fuel cartridge 11 is free, the valve body 19c in the fuel cartridge 11 is pressed against the O-ring 28 under the force of the return spring 27 in the airtight fashion and accordingly the external air cannot enter the fuel cartridge 11, whereby oxidization of the hydrogen storage alloy X is prevented.

When the fuel cartridge 11 is pushed toward the connection unit 8, the inner tubular member 19b of the connector 19 is brought into abutment against the bottom of a recess 23c formed in the connector 23 on the connection unit side, and when the connection unit 8 is further pushed toward the connection unit 8, the inner tubular member 19b is moved rightward relative to the connector body 19b overcoming the force of the return spring 27 and the tubular member 31 together with the connector body 23b is moved leftward relative to the support 29 overcoming the force of the return spring 32. Thus in the state whether the fuel cartridge 11 has been completely pushed toward the connection unit 8, the opening 25 of the connector 19 on the fuel cartridge side communicates with the branch passage 5a by way of the tubular members 19b and 31 as shown in FIG. 7.

As shown in FIGS. 2 and 3, a lid 34 is hinged to the rear end of the cartridge casing 7 at its lower edge. Engagement members 35 fixed to the upper edge of the lid 34 are engaged with engagement members 36 fixed to the upper surface of the cartridge casing 7 when the lid 34 is closed and hold the lid 34 in the closed position. In the closed position, a leaf spring 37 on the inner surface of the lid 34 resiliently pushes the fuel cartridges 11 toward the connection unit 8.

Figure 8:
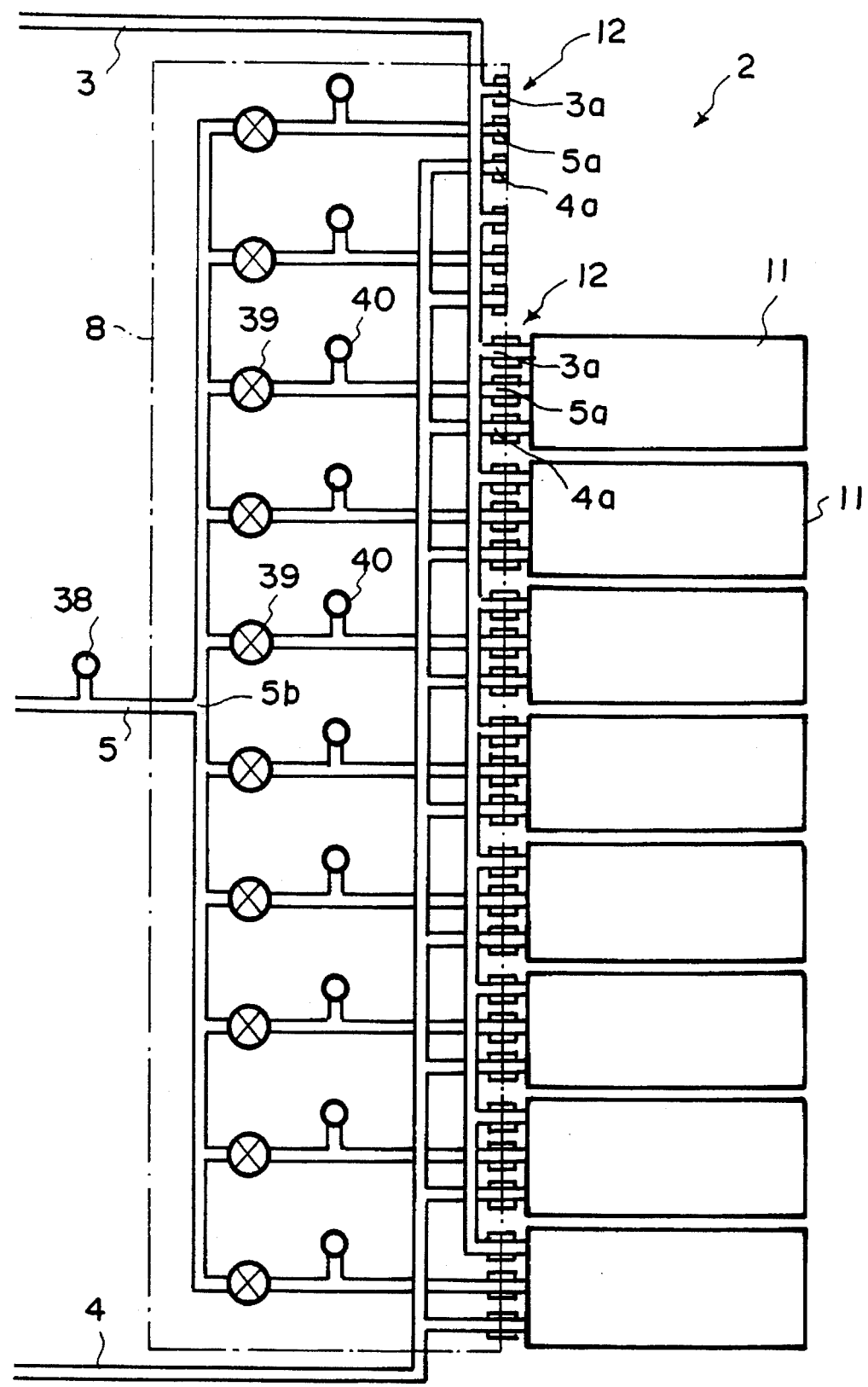
FIG. 8 is a schematic view showing in more detail the hydrogen gas storage portion of the first embodiment.

As shown in FIG. 8, each of the joint portions 12 is provided with branch passages 3a, 4a and 5a which respectively communicate with the engine coolant supply passage 3, the return passage 4 and the hydrogen gas supply passage 5. The engine coolant at a regulated temperature flows through the engine coolant supply passage 3, the conduit 15 in each fuel cartridge 11 and the return passage 4 and heats the hydrogen storage alloy X, whereby the hydrogen storage alloy X discharges hydrogen gas, which flows into the hydrogen gas supply passage 5 through the branch passage 5a.

The branch passages 5a are merged into the hydrogen gas supply passage 5 at a junction 5b. A first pressure sensor 38 is provided in the hydrogen gas supply passage 5 downstream of the junction 5b. On-off valves 39 are provided in the branch passages 5a to open and close the respective branch passages 5a. Second pressure sensors 40 are provided in the respective branch passages 5a upstream of the on-off valves 39 and detect the pressures of the hydrogen gas discharged from the respective fuel cartridges 11.

Figure 9:
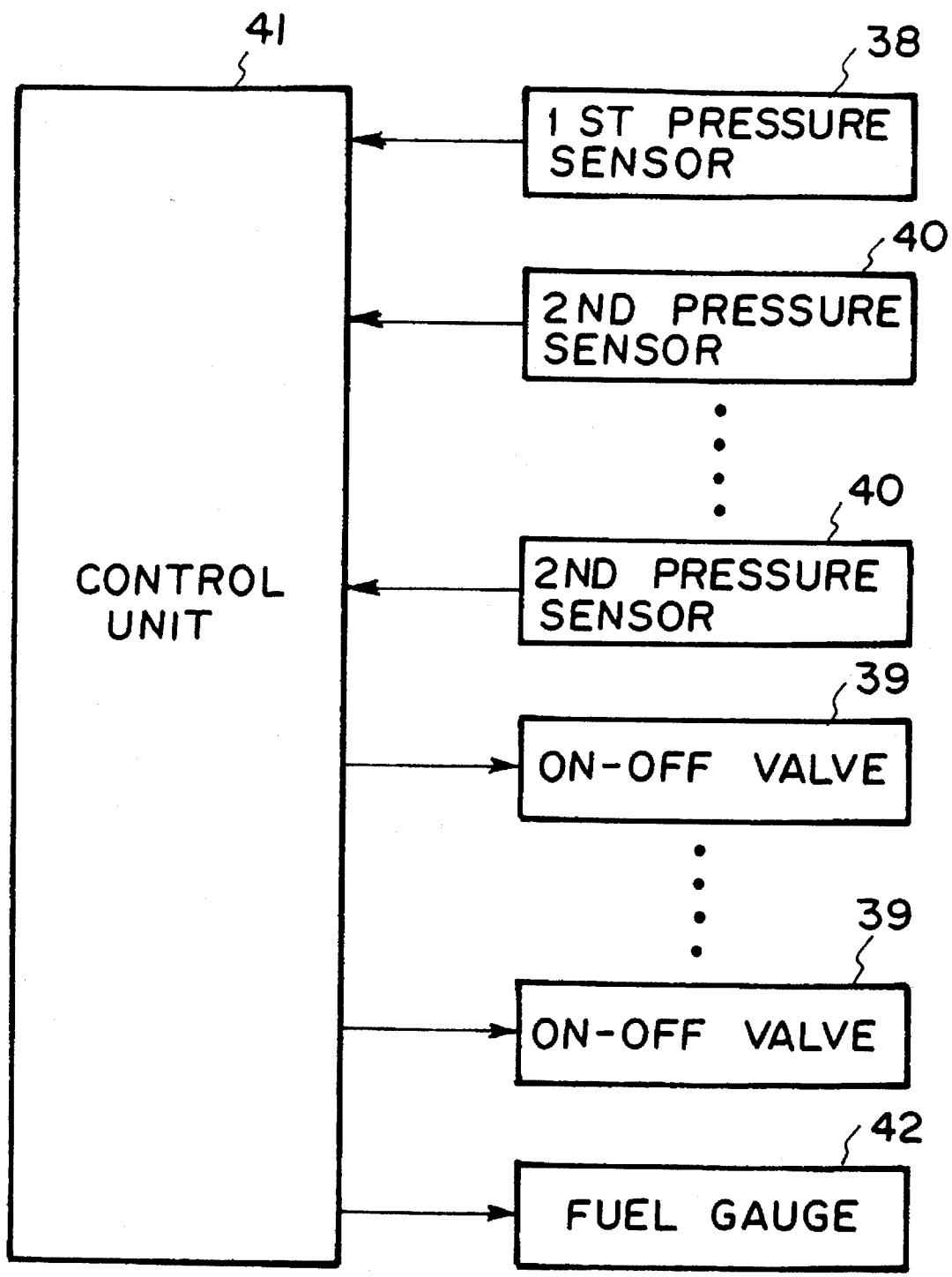
FIG. 9 is a schematic view showing the control system of the hydrogen gas supply system of the first embodiment.

The hydrogen gas supply system of this embodiment is further provided with an electronic control unit 41 as shown in FIG. 9. The control unit 41 determines the quantities of hydrogen gas in the respective fuel cartridges 11 on the basis of pressure signals from the second pressure sensors 40 and causes a fuel gauge 42 to indicate the quantity of the remaining hydrogen gas. Further the control unit 41 selectively closes and opens the on-off valves 39 on the basis of a pressure signal from the first pressure sensor 38.

Figure 10:
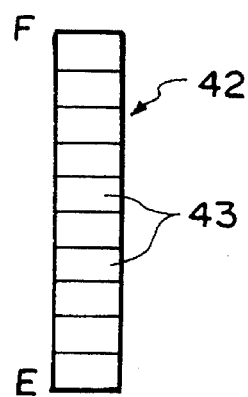
FIG. 10 is a schematic view showing the fuel gauge.

As shown in FIG. 10, the fuel gauge 42 comprises a plurality of indicator cells 43 which are arranged in a row.

Figure 11:
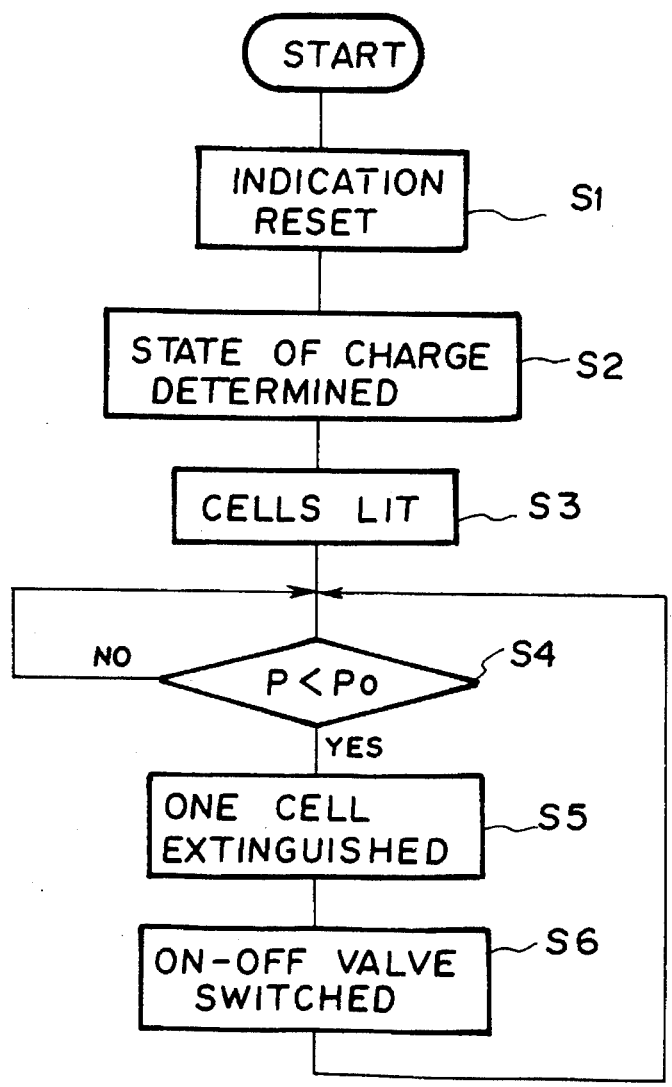
FIG. 11 is a flow chart for illustrating the operation of the control unit.

The hydrogen gas supply control executed by the control unit 41 will be described with reference to the flow chart shown in FIG. 11, hereinbelow.

That is, the control unit 41 resets the indication of the fuel gauge 42 when the fuel cartridges 11 are changed. (step S1) Then in step S2, the control unit 41 performs a predetermined processing of determining the states of charge of the respective fuel cartridges 11. That is, the control unit 41 reads the pressure signals from the respective second pressure sensors 40 and determines whether the pressures of hydrogen gas represented by the pressure signals are higher than a predetermined reference pressure. The control unit 41 determines that the fuel cartridges 11 corresponding to the pressure signals which represent the pressures higher than the reference pressure are fully charged. Then the control unit 41 opens one of the on-off valves 39 corresponding to the fuel cartridges 11 full of hydrogen gas according to a predetermined order.

Figure 12:
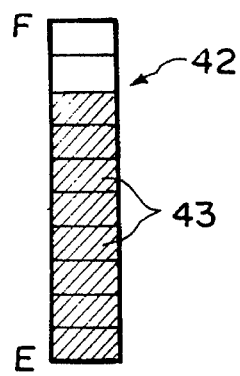
FIG. 12 is a schematic view showing a state of the fuel gauge just after the vehicle is replenished with new fuel cartridges.

Thereafter the control unit 41 lights the same number of indicator cells 43 as the number of the fuel cartridges 11 full of hydrogen gas. For example, when eight fuel cartridges 11 full of hydrogen gas are connected to the joint portions 12, the control unit 41 lights the eight indicator cells 43 from the lowermost one as shown in FIG. 12 (hatched portion).

Figure 13:
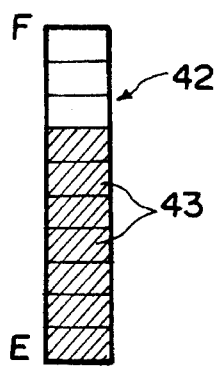
FIG. 13 is a schematic view showing a state of the fuel gauge after one fuel cartridge is exhausted.

Then is step S41, the control unit 41 repeatedly determines whether the pressure P represented by the pressure signal from the first pressure sensor 38 is lower than a reference value Po until the former becomes lower than the latter. When the pressure P represented by the pressure signal from the first pressure sensor 38 becomes lower than the reference value Po, the control unit 41 extinguishes the uppermost one of the indicator cells 43 which has been lit as shown in FIG. 13. (step S5) Then is step S6, the control unit 41 closes the on-off valve 39 which has been opened and opens the on-off valve 39 corresponding to another of the fuel cartridges 11 full of hydrogen gas. Thus the number of the lighted indicator cells 43 reflects the number of the fuel cartridges 11 full of hydrogen gas and accordingly the remaining quantity of hydrogen gas can be surely recognized.

As can be understood from the description above, in this embodiment, since the fuel cartridges 11 are removably attached to the hydrogen gas supply passage 5, the engine 1 can be replenished with hydrogen gas only by replacing the exhausted fuel cartridges 11 with new fuel cartridges 11 full of hydrogen gas.

Figure 14:
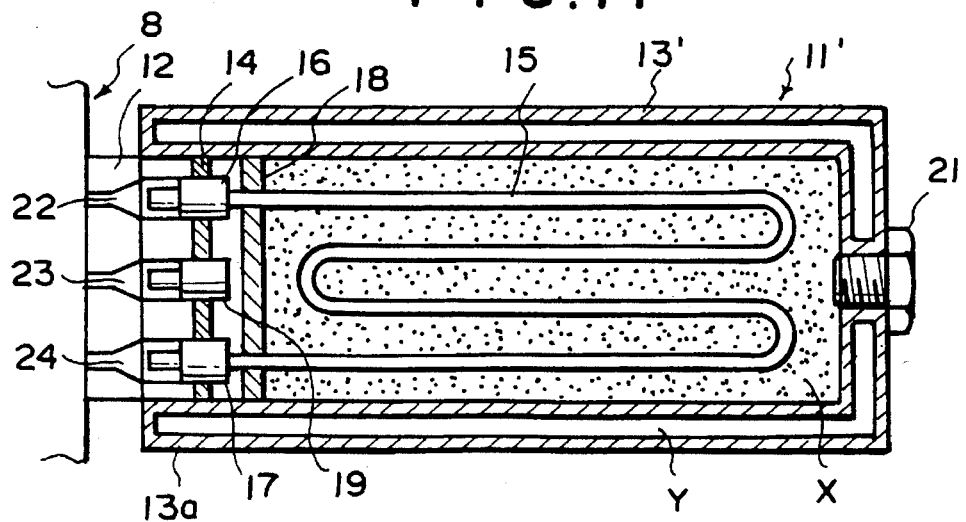
FIG. 14 is a cross-sectional view showing a modification of the fuel cartridge.

FIG. 14 shows a modification of the fuel cartridge 11. The fuel cartridge 11' of this modification differs from the fuel cartridge 11 shown in FIG. 5 in that the casing 13' has a double wall structure comprising inner and outer walls, and the space between the inner and outer walls is filled with water Y. This structure is advantageous in that the hydrogen storage alloy X is rapidly cooled by the water Y in case where the fuel cartridge 11' is broken while the hydrogen storage alloy X is at a high temperature, thereby preventing an accidental hydrogen gas leak.

The hydrogen gas supply system of the present invention can be mounted on a vehicle in the following manner.

Figure 15:
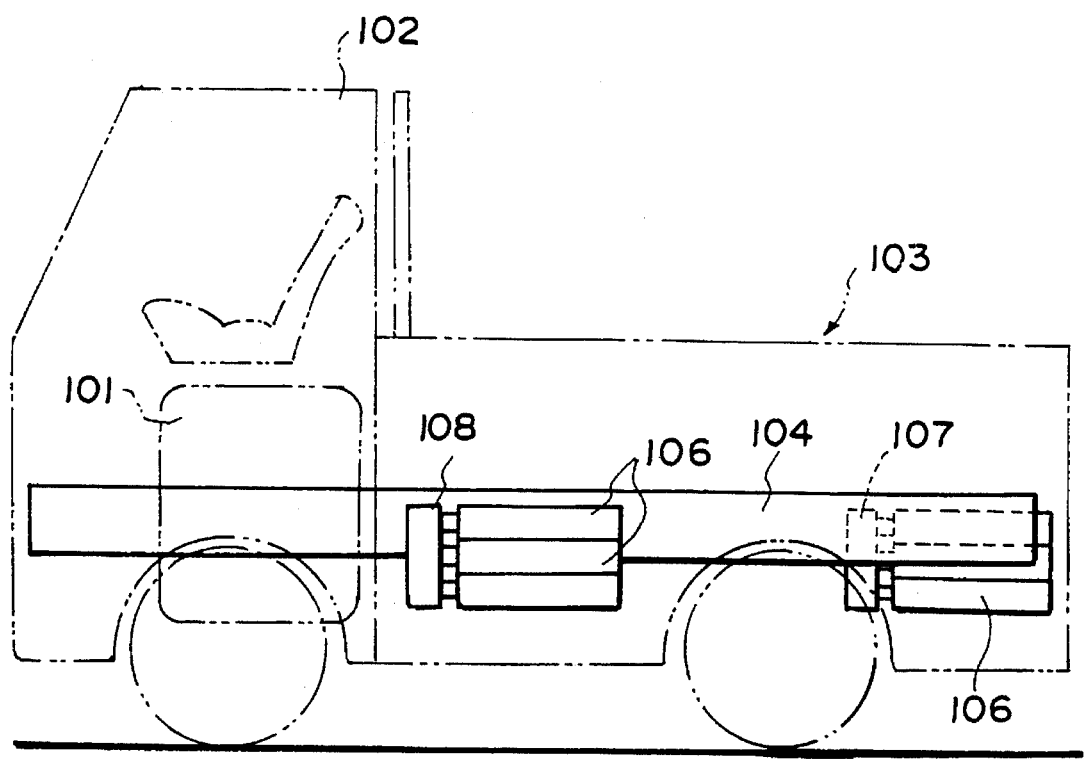
FIG. 15 is a schematic side view of a vehicle showing an example of the manner of mounting the fuel cartridges on the vehicle.
Figure 16:
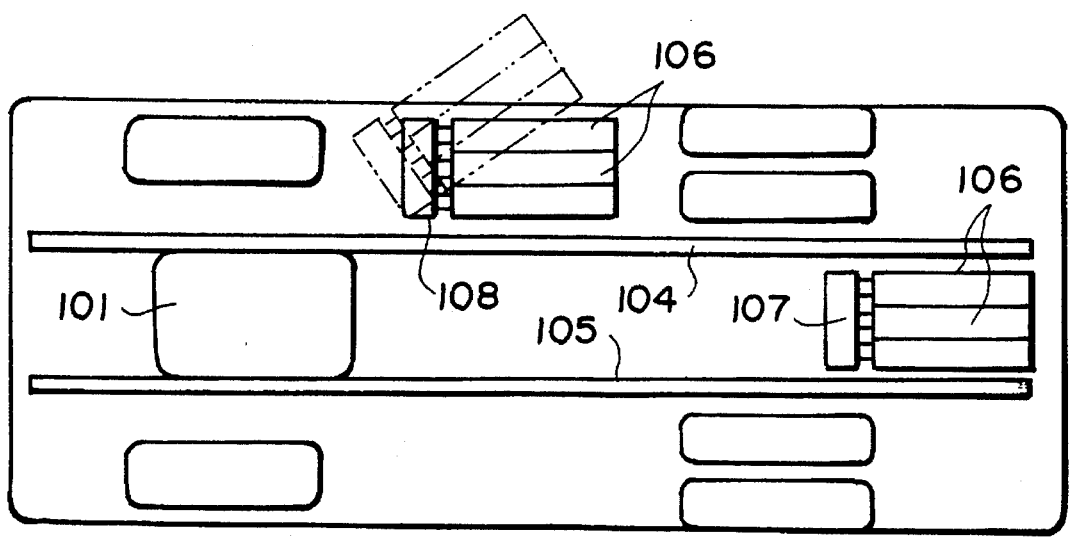
FIG. 16 is a schematic bottom view of the vehicle.

For example, as shown in FIGS. 15 and 16, in the case of a cab-over type vehicle in which a cabin 102 is positioned above an engine 101, a connection unit 107 is provided between a pair of side frames 104 and 105 near the rear end of a vehicle body 103 and another connection unit 108 is provided on the outer side of the side frame 104 with connection units being exposed downward. Reference numeral 106 denotes a fuel cartridge. The connection unit 108 is mounted to be swung outward as shown by the chained line in FIG. 16 and the fuel cartridges 106 are changed with the connection unit 108 in the swung position.

Figure 17:
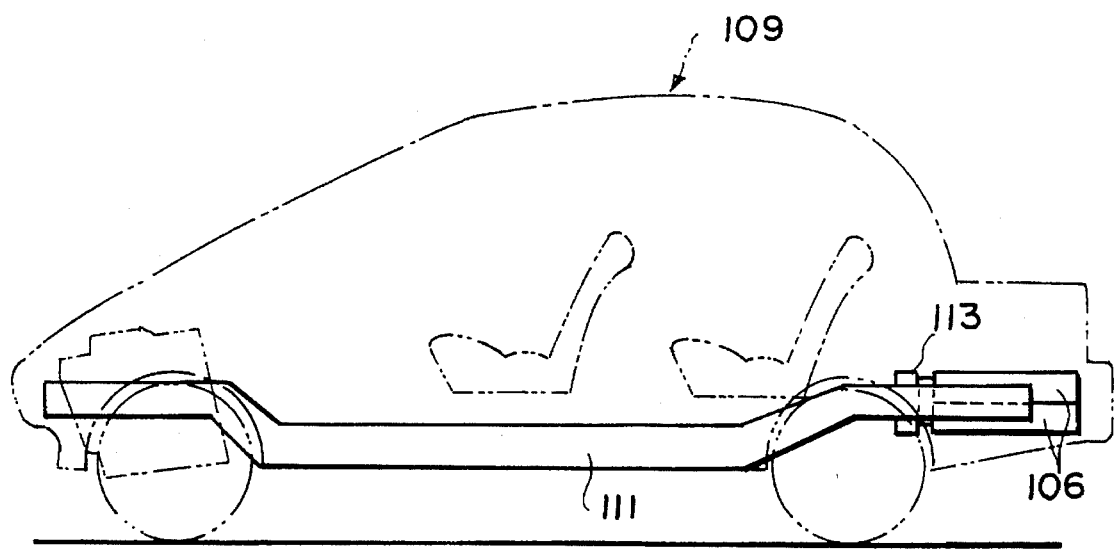
FIG. 17 is a schematic side view of a vehicle showing another example of the manner of mounting the fuel cartridges on the vehicle.
Figure 18:
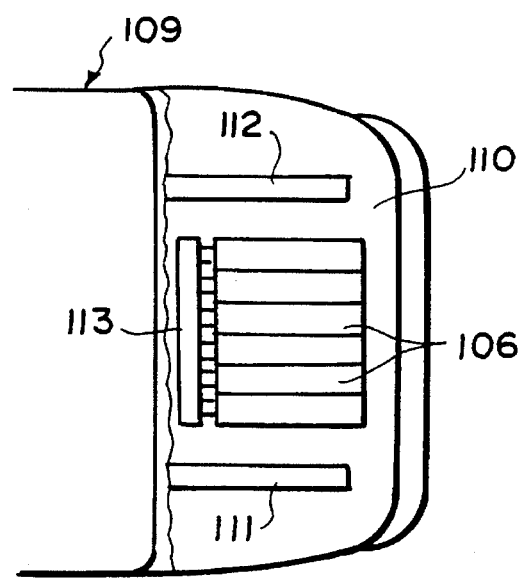
FIG. 18 is a fragmentary plan view showing the rear part of the vehicle with a part of the outer panel of the vehicle body removed.

In the case of a sedan type vehicle, a connection unit 113 is provided between side frames 111 and 112 below a trunk 110 on the rear of the vehicle to extend in the transverse direction of the vehicle body as shown in FIGS. 17 and 18.

Figure 19:
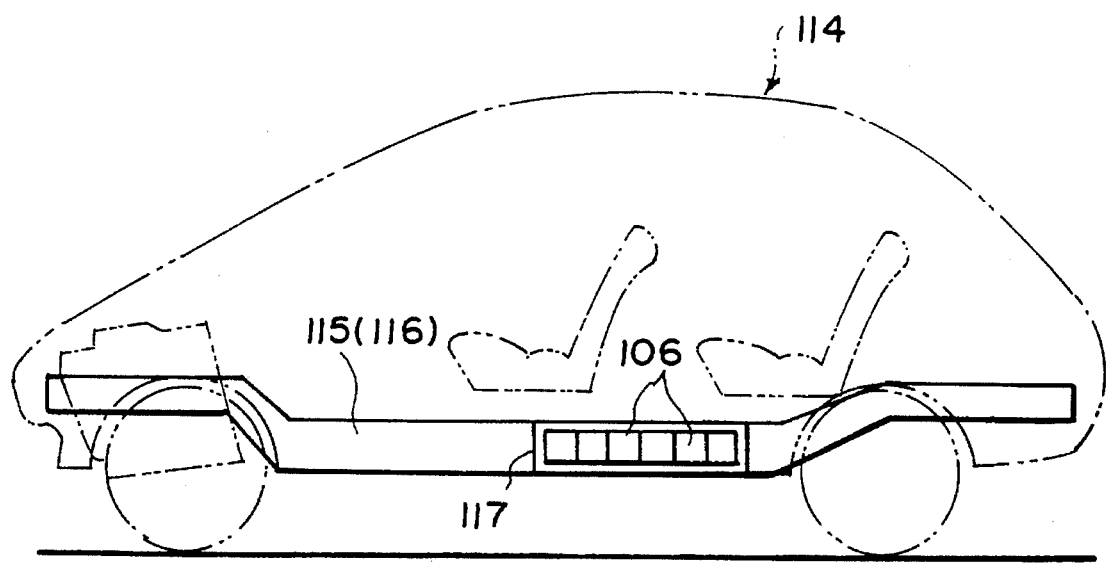
FIG. 19 is a schematic side view of a vehicle showing still another example of the manner of mounting the fuel cartridges on the vehicle.
Figure 20:
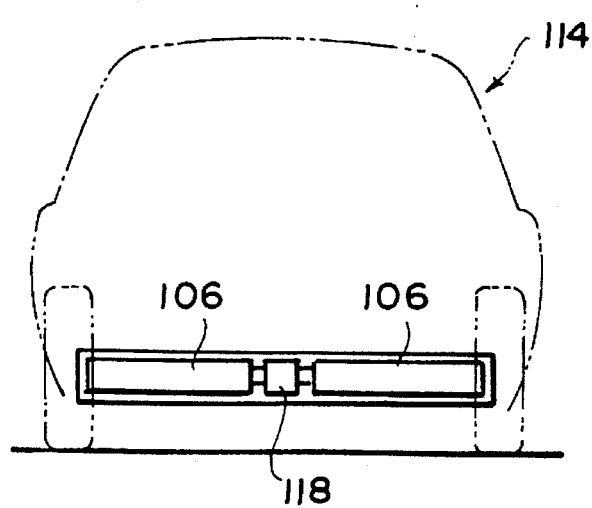
FIG. 20 is a schematic rear view of the vehicle.

In the example shown in FIGS. 19 and 20, an opening 117 is provided in each of side frames 115 and 166 extending in the longitudinal direction of the vehicle body and a connection unit 118 is provided to extend in the longitudinal direction of the vehicle body between the side frames 115 and 116. In this case, the fuel cartridges 106 are connected to the connection unit 118 from opposite sides of the vehicle body as clearly shown in FIG. 20. Accordingly more numbers of fuel cartridges 106 can be mounted.

In the embodiment described above, the conduits for circulating the engine coolant through the respective fuel cartridges 11 are connected to the engine coolant supply passage in parallel to each other. This arrangement can give rise to a problem that the engine coolant cannot be uniformly distributed to all the fuel cartridges 11. When the engine coolant is not uniformly distributed to the fuel cartridges 11, the hydrogen gas stored in the fuel cartridges 11 is unevenly consumed.

Figure 21:
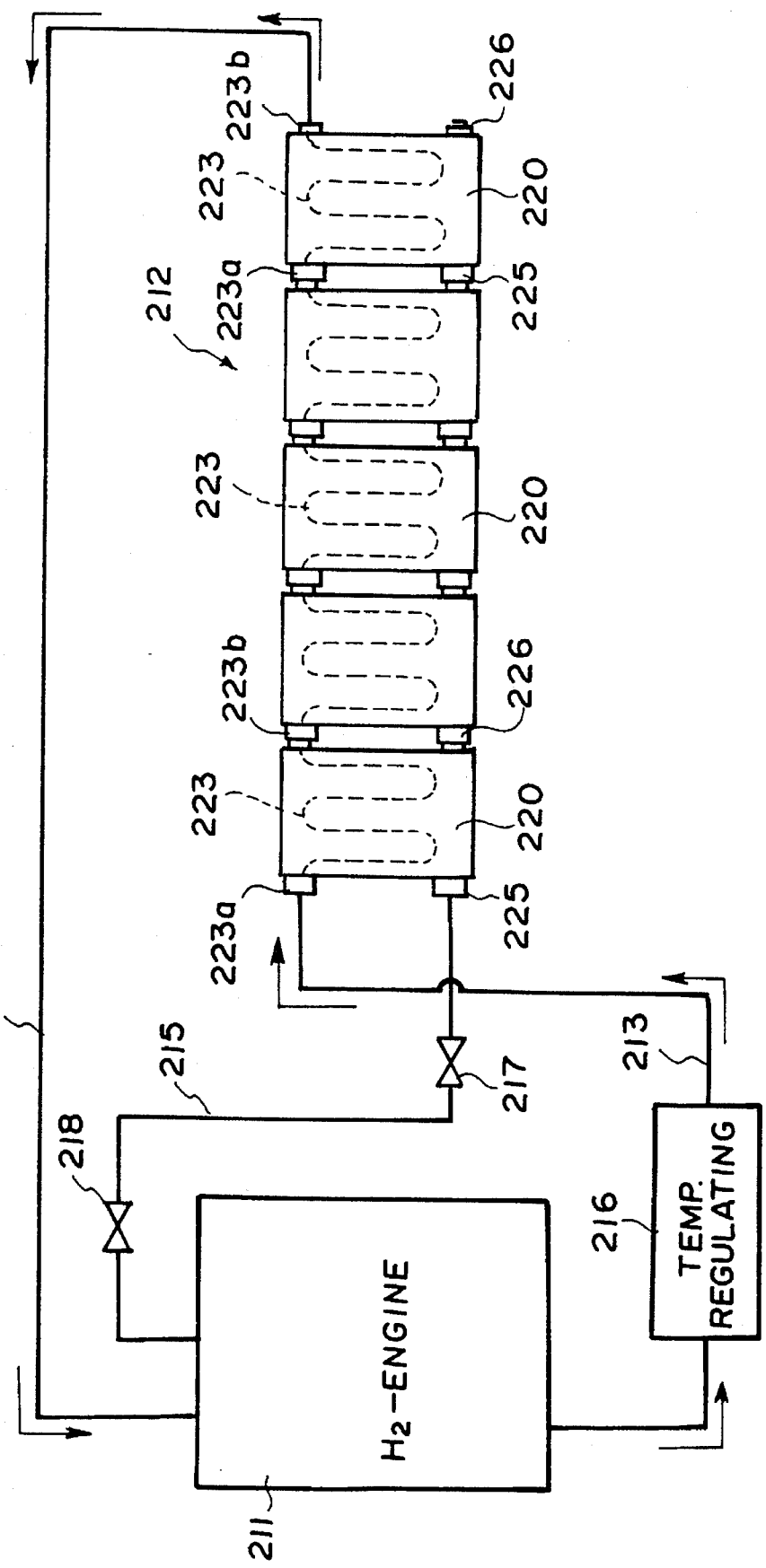
FIG. 21 is a schematic view showing a hydrogen gas supply system in accordance with a second embodiment of the present invention.

In a second embodiment of the present invention shown in FIG. 21, the conduits for circulating the engine coolant through the respective fuel cartridges 11 are connected to the engine coolant supply passage in series.

In FIG. 21, the hydrogen gas supply system for a hydrogen engine 211 has a hydrogen gas storage portion 212. An engine coolant supply passage 213 which leads engine coolant discharged from the engine 211 to the hydrogen gas storage portion 212, a return passage 214 for returning the engine coolant to the engine 211 and a hydrogen gas supply passage 215 which leads hydrogen gas from the hydrogen gas storage portion 212 to the engine 211 are provided between the engine 211 and the hydrogen gas storage portion 212. The engine coolant supply passage 213 is provided with a temperature regulating portion 216 which regulates the temperature of the engine coolant to be introduced into the hydrogen gas storage portion 212. The hydrogen gas supply passage 215 is provided with a pair of on-off valves 217 and 218.

In the hydrogen gas storage portion 212, there are provided a plurality of fuel cartridges 220 arranged in a row.

Figure 22:
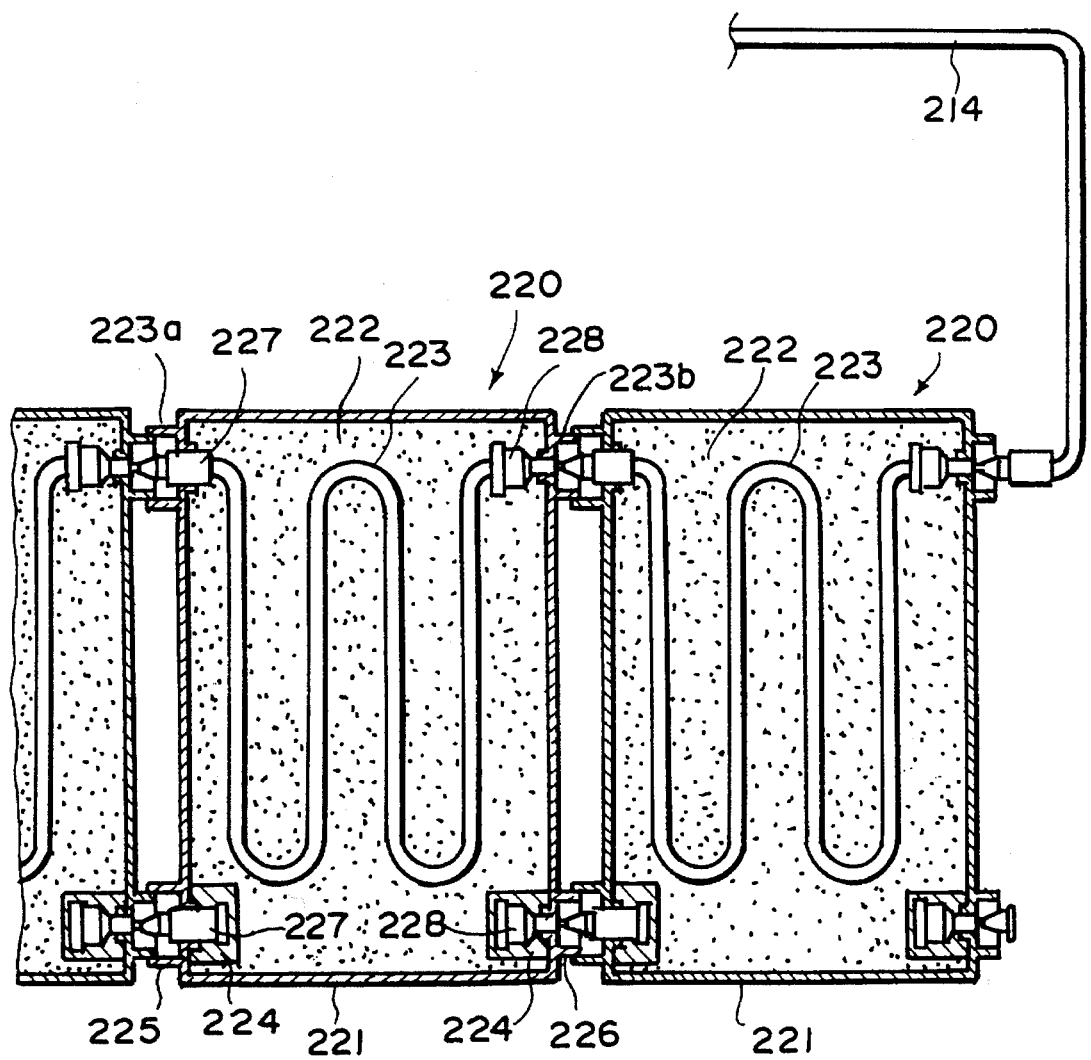
FIG. 22 is a vertical cross-sectional view showing the fuel cartridge employed in the second embodiment.

As shown in FIG. 22, each fuel cartridge 220 comprises a casing 221 and a hydrogen storage alloy 222 which may be, for instance, of titanium-manganese alloy, housed in the casing 221. A twisty engine coolant passage 223 extends through the hydrogen storage alloy 222 and an inlet 223a and an outlet 223b of the engine coolant passage 223 are provided respectively on upper parts of front and rear walls of the casing 221. The inlet 223a of the upstream-most (leftmost as seen in FIG. 21) fuel cartridge 220 is connected to the end of the engine coolant supply passage 213 and the outlet 223b of the downstream-most (rightmost as seen in FIG. 21) fuel cartridge 220 is connected to the end of the return passage 214. The inlet 223a of each of the intermediate fuel cartridges 220 is connected to the outlet 223b of the fuel cartridge 220 adjacent thereto on the upstream side and the outlet 223b of each of the intermediate fuel cartridges 220 is connected to the inlet 223b of the fuel cartridge 220 adjacent thereto on the downstream side. Thus the engine coolant passages 223 of the fuel cartridges 220 are connected in series to the engine coolant supply passage 213 and the return passage 214.

A hydrogen gas takeout port 225 communicating with the hydrogen storage alloy 222 by way of a filter 224 is provided on a lower part of the front end wall of the casing 221 and a connection port 226 also communicating with the hydrogen storage alloy 222 by way of a filter 224 is provided on a lower part of the rear end wall of the casing 221. The connection port 226 of each of the intermediate fuel cartridges 220 are connected to the hydrogen gas takeout port 225 of the fuel cartridge 220 adjacent thereto on the upstream side.

Figure 23:
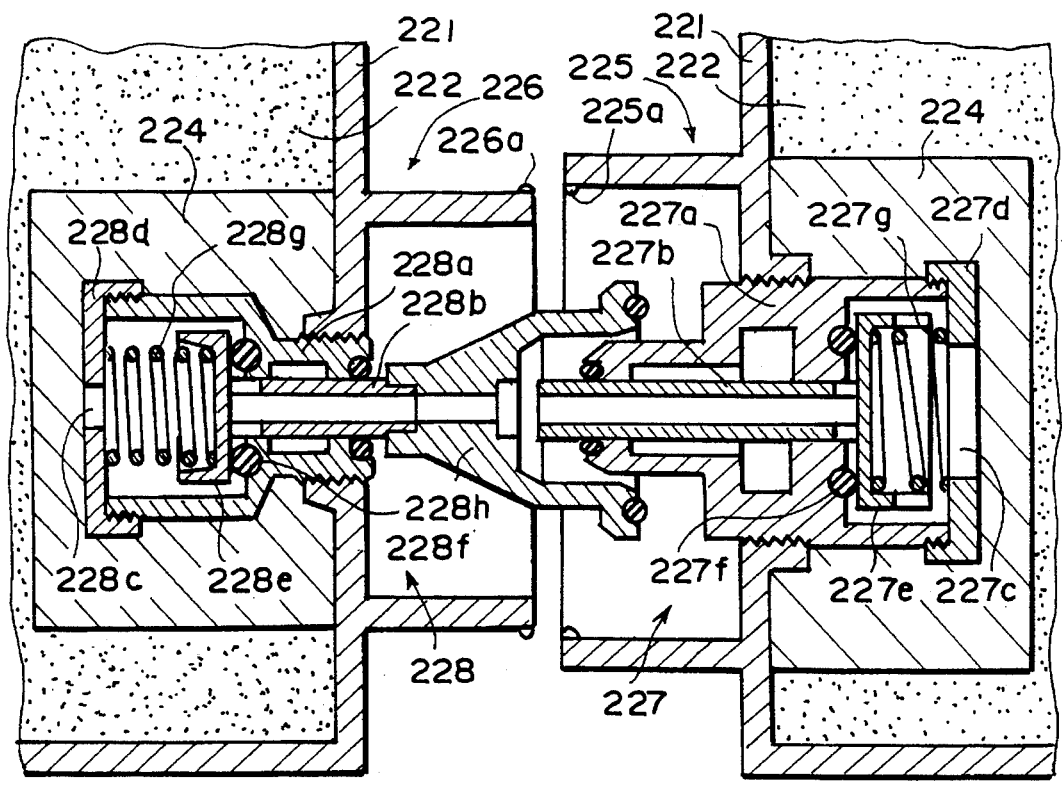
FIG. 23 is an enlarged fragmentary cross-sectional view showing the connection between the fuel cartridges in the second embodiment in the state where the fuel cartridges are disconnected.

Since the connection between the inlet 223a and the outlet 223b of the engine coolant passages 223 are the same in structure as the connection between the hydrogen gas takeout port 225 and the connection port 226 of the adjacent fuel cartridges 220, only the latter connection will be described hereinbelow. As shown in FIGS. 23 and and 24, the hydrogen gas takeout port 225 is provided with a connector 227 and the connection port 226 is provided with a connector 228. The connector 227 comprises a connector body 227a mounted on the casing 221 and an inner tubular member 227b which extends through the connector body 227a and is slidable relative to the same. A spring retainer 227d provided with an opening 227c is screwed on the rear end of the connector body 227a and is in contact with the filter 224. A valve body 227e is formed on the rear end of the inner tubular member 227b and is opposed to an O-ring 227f which is provided in a wall surface in front of the valve body 227e. A return spring 227g is provided between the spring retainer 227d and the valve body 227e and resiliently presses the valve body 227e against the O-ring 227f.

The connector 228 comprises a connector body 228a mounted on the casing 221 and an inner tubular member 228b which extends through the connector body 228a and is slidable relative to the same. A spring retainer 228d provided with an opening 228c is screwed on the rear end of the connector body 228a and is in contact with the filter 224. A valve body 228e is formed on the rear end of the inner tubular member 228b and is opposed to an O-ring 228f which is provided in a wall surface in front of the valve body 228e. A return spring 228g is provided between the spring retainer 228d and the valve body 228e and resiliently presses the valve body 228e against the O-ring 228f. A connector head 228h having a recessed portion into which the front end portion of the inner tubular member 227b of the connector 227 is inserted is fixed to the front end of the inner tubular member 228b. When the connectors 227 and 228 are disconnected, the valve bodies 227e and 228e are respectively pressed against the O-rings 227f and 228f under the force of the return springs 227g and 228g in the airtight fashion as shown in FIG. 23 and accordingly the external air cannot enter the fuel cartridges 221, whereby oxidization of the hydrogen storage alloys 222 is prevented, and at the same time the hydrogen gas cannot leak out of the fuel cartridge 220.

When the connectors 227 and 228 are moved toward each other to connect them, the front end of the inner tubular member 227b of the connector 227 is brought into abutment against the connector head 228h of the other connector 228 and the valve bodies 227e and 228e are moved away from the O-rings 227f and 228f overcoming the force of the return springs 227g and 228g, whereby the openings 227c and 228c in the spring retainers 227d and 228d comes to communicate with each other through the inner tubular members 227b and 228b and the hydrogen storage alloys 222 in the fuel cartridges 220 are communicated with each other.

Figure 24:
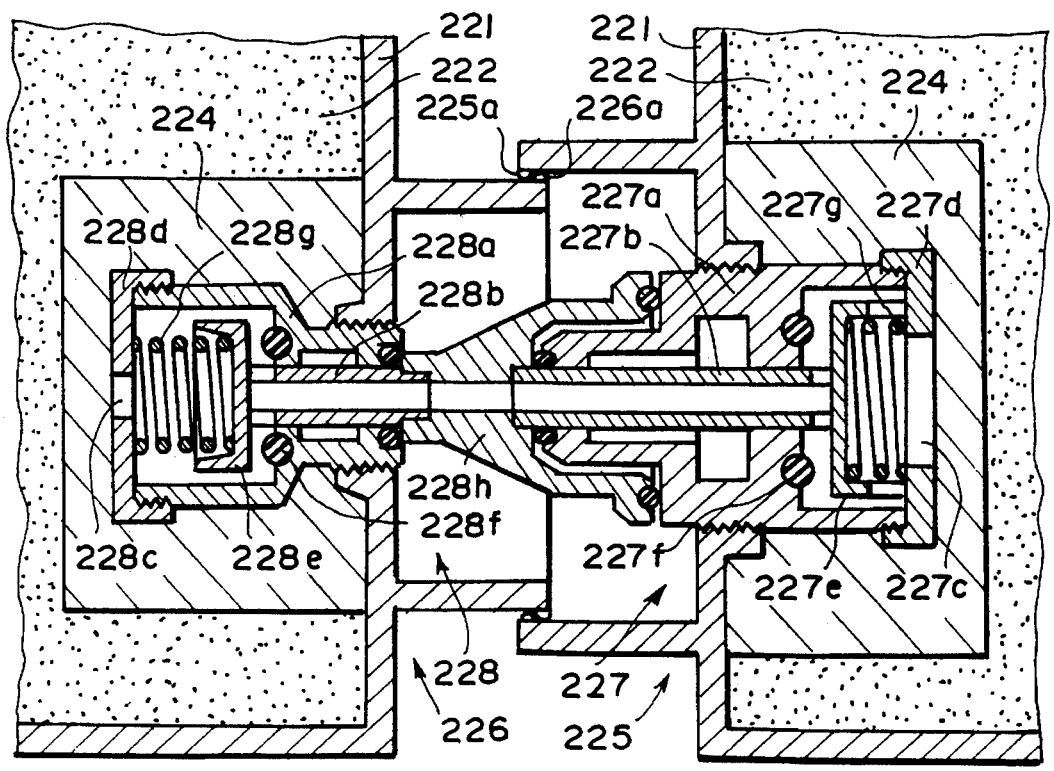
FIG. 24 is an enlarged fragmentary cross-sectional view showing the connection between the fuel cartridges in the second embodiment in the state where the fuel cartridges are connected.

When the connectors 227 and 228 are connected to each other, the hydrogen gas takeout port 225 is fitted on the connection port 226 and an engagement projection 225a formed on the inner peripheral surface of the hydrogen gas takeout port 225 is engaged with an engagement projection 226a formed on the inner peripheral surface of the connection port 226 as shown in FIG. 24, whereby the adjacent fuel cartridges 220 are fixed to each other.

The engine coolant passages 223 in the adjacent fuel cartridges 220 are connected through the same structure, and the engine coolant passages 223 in the respective fuel cartridges 220 are connected in series between the engine coolant supply passage 213 and the return passage 214. The hydrogen storage alloys 222 in the fuel cartridges 220 are heated by the engine coolant which circulates between the engine 211 and the fuel cartridges 220 through the engine coolant supply passage 213 and the return passage 214 and hydrogen gas discharged from the hydrogen storage alloys 222 is supplied to the hydrogen gas supply passage 215.

With the arrangement described above, since the engine coolant passages 223 in the fuel cartridges 220 are connected in series, the engine coolant is uniformly supplied to all the fuel cartridges 220 without stagnancy of the engine coolant which is apt to occur when the engine coolant passages 223 are connected in parallel to each other, whereby the hydrogen gas stored in the fuel cartridges 220 can be uniformly consumed.

Further since the outlet 223b of the engine coolant passage 223 of each fuel cartridge 220 is directly connected to the inlet 223a of the engine coolant passage 223 of another fuel cartridge 220, the overall connection structure is simplified as compared with a case where the outlet 223b and the inlet 223a of the adjacent fuel cartridges 220 are connected through a communicating member. At the same time, the number of the fuel cartridges 220 can be easily changed depending on the expected running distance and/or the expected running condition, whereby mounting ease and handling ease of the fuel cartridges 220 are improved.

Further since the hydrogen gas takeout port 225 and the connection port 226 of each fuel cartridge 220 are automatically opened and closed in response to connection and disconnection of the connectors 227 and 228, connection and disconnection of the hydrogen gas takeout port 225 and the connection port 226 can be effected very easily and very surely.

Now a third embodiment of the present invention will be described with reference to FIGS. 25 and 26, hereinbelow.

Figure 25:
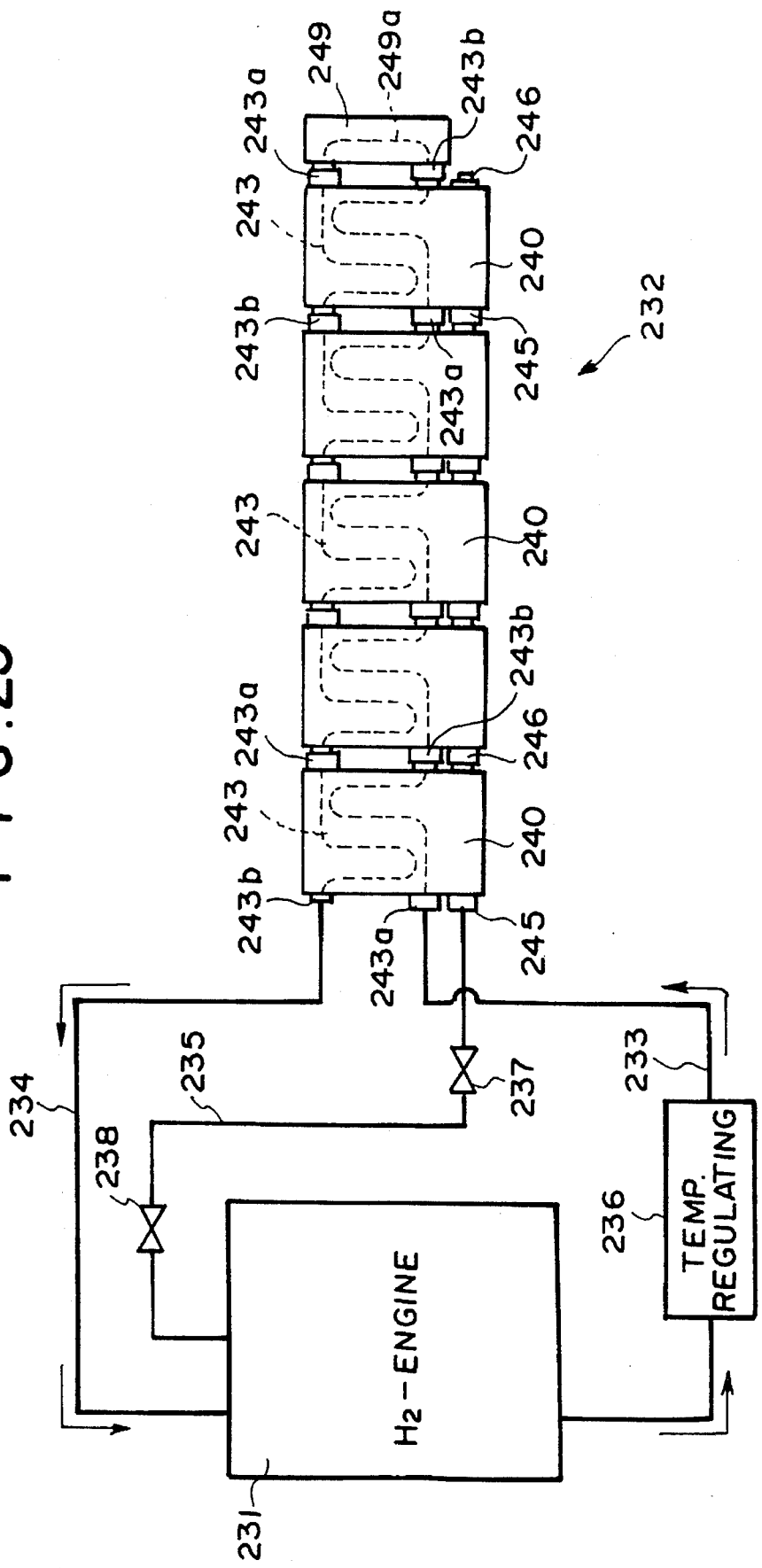
FIG. 25 is a view similar to FIG. 21 but showing a hydrogen gas supply system in accordance with a third embodiment of the present invention.

In FIG. 25, the hydrogen gas supply system for a hydrogen engine 231 has a hydrogen gas storage portion 232. An engine coolant supply passage 233 which leads engine coolant discharged from the engine 231 to the hydrogen gas storage portion 232, a return passage 234 for returning the engine coolant to the engine 231 and a hydrogen gas supply passage 235 which leads hydrogen gas from the hydrogen gas storage portion 232 to the engine 231 are provided between the engine 231 and the hydrogen gas storage portion 232. The engine coolant supply passage 233 is provided with a temperature regulating portion 236 which regulates the temperature of the engine coolant to be introduced into the hydrogen gas storage portion 232. The hydrogen gas supply passage 235 is provided with a pair of on-off valves 237 and 238.

In the hydrogen gas storage portion 232, there are provided a plurality of fuel cartridges 240 arranged in a row.

Figure 26:
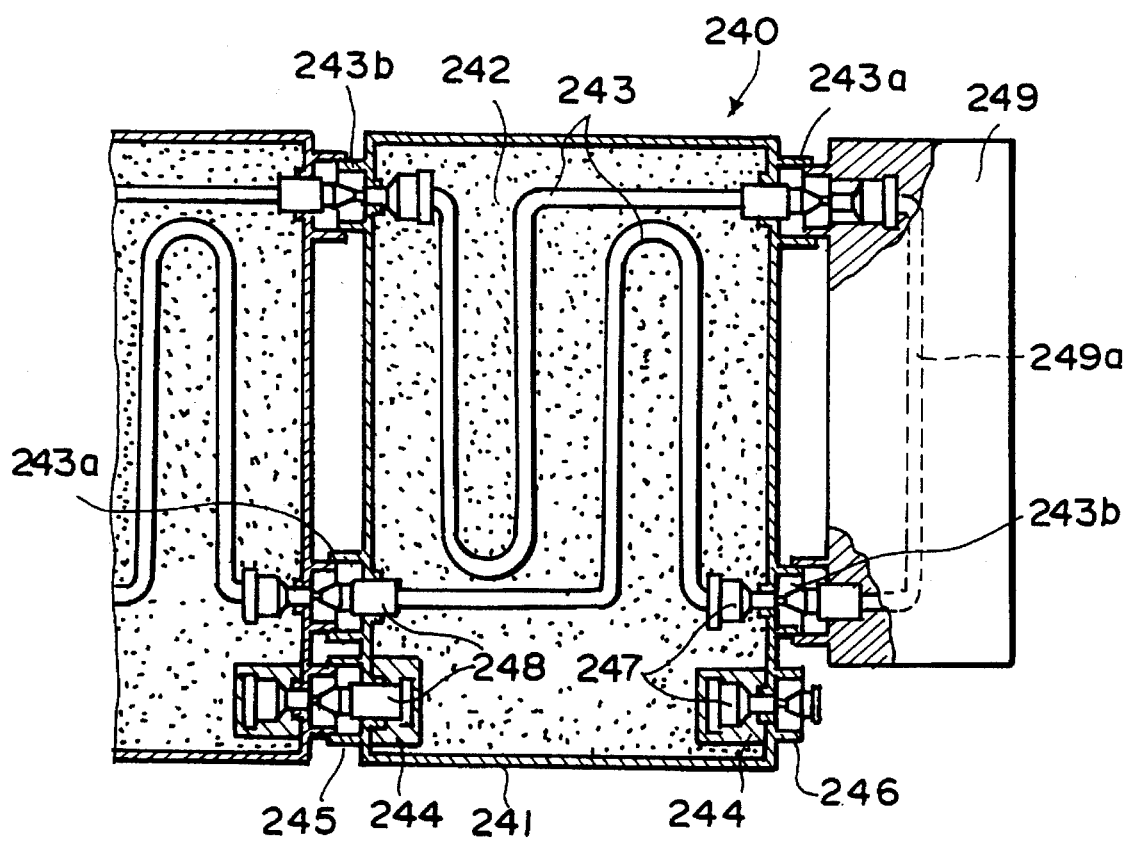
FIG. 26 is an enlarged cross-sectional view showing the fuel cartridges and the communicating member employed in the third embodiment.

As shown in FIG. 26, each fuel cartridge 240 comprises a casing 241 and a hydrogen storage alloy 242 which may be, for instance, of titanium-manganese alloy, housed in the casing 241. A pair of twisty engine coolant passages 243 extend through the hydrogen storage alloy 242 and inlets 243a and outlets 243b of the engine coolant passages 243 are provided on front and rear end walls of the casing 241, the inlet 243a of one of the engine coolant passages 243 and the outlet 243b of the other engine coolant passage 243 on the front end wall and the outlet 243b of said one engine coolant passage 243 and the inlet 243a of said the other engine coolant passage 243 on the rear end wall. A hydrogen gas takeout port 245 communicating with the hydrogen storage alloy 242 by way of a filter 244 is provided on the front end wall of the casing 241 and a connection port 246 also communicating with the hydrogen storage alloy 242 by way of a filter 244 is provided on the rear end wall of the casing 241. The connection port 246 of each of the fuel cartridges 240 is connected to the hydrogen gas takeout port 245 of the fuel cartridge 240 adjacent thereto on the upstream side.

As shown in FIGS. 25 and 26, a communicating member 249 is connected to the rightmost fuel cartridge 240 to connect the outlet 243b of one of the engine coolant passages 243 of the rightmost fuel cartridge 240 to the inlet 243a of the other engine coolant passage 243 of the same fuel cartridge 240 by way of a communicating passage 249a formed in the communicating member 249.

The connections between the engine coolant supply passage 233 and the inlet 243a of one of the engine coolant passage 243 of the leftmost fuel cartridge 240, between the return passage 234 and the outlet 243b of the other engine coolant passage 243 of the leftmost fuel cartridge 240, between the outlet 243b and inlet 243a of the engine coolant passages 243 of the rightmost fuel cartridge 240 and the communicating passage 249a in the communicating member 249, between the outlets 243b and the inlet 243a of adjacent intermediate fuel cartridges 240, and between the connection port 246 and the hydrogen gas takeout port 245 of the adjacent fuel cartridges 240 are made by connectors 247 and 248 which are the same in structure as the connectors 227 and 228 described above.

With the arrangement described above, since one engine coolant passages 243 in the respective fuel cartridges 240 are connected in series, the other engine coolant passages 243 in the respective fuel cartridges 240 are connected in series and the passages formed by said one engine coolant passages 243 and said the other engine coolant passages 243 are connected in series by the communicating passage 249a in the communicating member 249, a continuous engine coolant passage through which the engine coolant flows in one direction and in the reverse direction is formed. Accordingly, as in the second embodiment, the engine coolant is uniformly supplied to all the fuel cartridges 240 without stagnancy of the engine coolant which is apt to occur when the engine coolant passages 243 are connected in parallel to each other, whereby the hydrogen gas stored in the fuel cartridges 240 can be uniformly consumed.

Further since the outlet 243b of the engine coolant passage 243 of each fuel cartridge 240 is directly connected to the inlet 243a of the engine coolant passage 243 of another fuel cartridge 240 as in the second embodiment, the overall connection structure is simplified as compared with a case where the outlet 243b and the inlet 243a of the adjacent fuel cartridges are connected through a communicating member. At the same time, the number of the fuel cartridges 240 can be easily changed depending on the expected running distance and/or the expected running condition, whereby mounting ease and handling ease of the fuel cartridges 240 are improved.

Further since the hydrogen gas takeout port 245 and the connection port 246 of each fuel cartridge 240 are automatically opened and closed in response to connection and disconnection of the connectors 247 and 248, connection and disconnection of the hydrogen gas takeout port 245 and the connection port 246 can be effected very easily and very surely.

Now a fourth embodiment of the present invention will be described with reference to FIGS. 27 and 28, hereinbelow.

Figure 27:
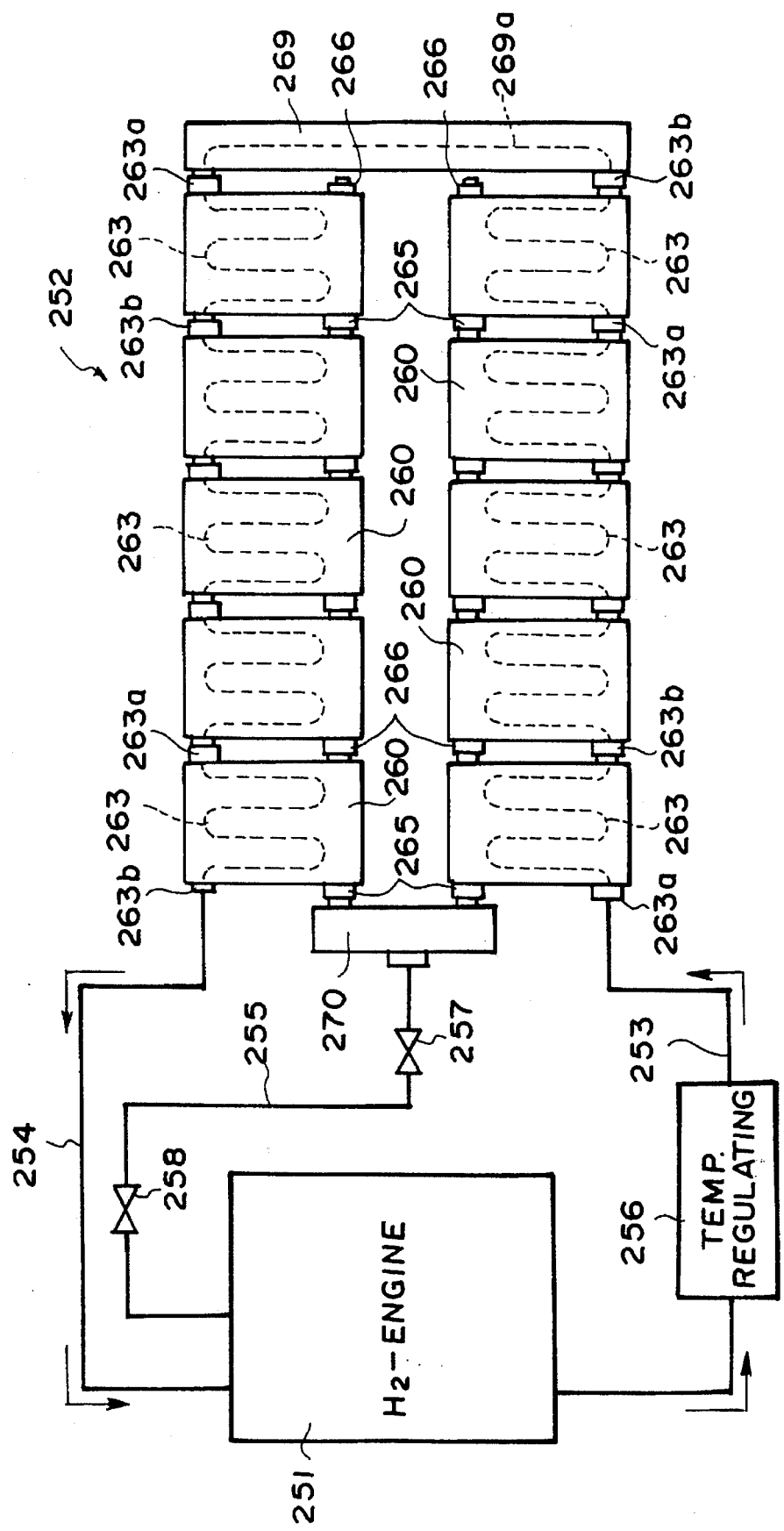
FIG. 27 is a view similar to FIG. 21 but showing a hydrogen gas supply system in accordance with a fourth embodiment of the present invention.

In FIG. 27, the hydrogen gas supply system for a hydrogen engine 251 has a hydrogen gas storage portion 252. An engine coolant supply passage 253 which leads engine coolant discharged from the engine 251 to the hydrogen gas storage portion 252, a return passage 254 for returning the engine coolant to the engine 251 and a hydrogen gas supply passage 255 which leads hydrogen gas from the hydrogen gas storage portion 252 to the engine 251 are provided between the engine 251 and the hydrogen gas storage portion 252. The engine coolant supply passage 253 is provided with a temperature regulating portion 256 which regulates the temperature of the engine coolant to be introduced into the hydrogen gas storage portion 252. The hydrogen gas supply passage 255 is provided with a pair of on-off valves 257 and 258.

In the hydrogen gas storage portion 252, there are provided a plurality of fuel cartridges 260 arranged in two rows.

Figure 28:
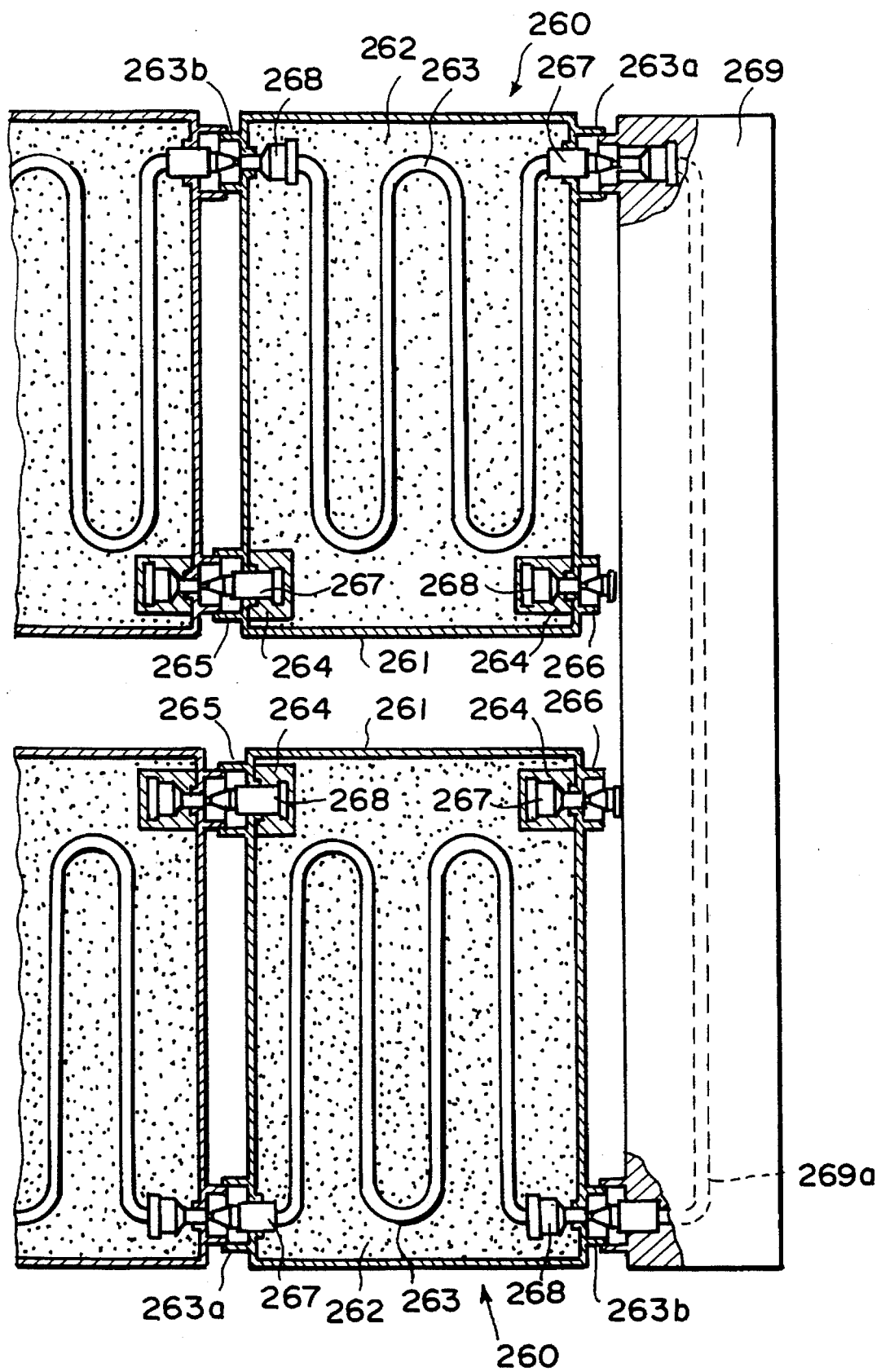
FIG. 28 is an enlarged cross-sectional view showing the fuel cartridges and the communicating member employed in the fourth embodiment.

As shown in FIG. 28, each fuel cartridge 260 comprises a casing 261 and a hydrogen storage alloy 242 which may be, for instance, of titanium-manganese alloy, housed in the casing 261. A twisty engine coolant passage 263 extends through the hydrogen storage alloy 262 and an inlets 263a and an outlet 263b of the engine coolant passages 263 are provided respectively on front and rear end walls of the casing 261. A hydrogen gas takeout port 265 communicating with the hydrogen storage alloy 262 by way of a filter 264 is provided on the front end wall of the casing 261 and a connection port 256 also communicating with the hydrogen storage alloy 262 by way of a filter 264 is provided on the rear end wall of the casing 261. The connection port 266 of each of the fuel cartridges 260 is connected to the hydrogen gas takeout port 265 of the fuel cartridge 260 adjacent thereto on the upstream side.

The inlet 263a of the engine coolant passage 263 of the leftmost fuel cartridge 260 in the lower row (as seen in FIG. 27) is connected to the engine coolant supply passage 253 and the outlet 263b of the engine coolant passage 263 of the leftmost fuel cartridge 260 in the upper row is connected to the return passage 254. Further the outlet 263b of the rightmost fuel cartridge 260 in the lower row is connected to the inlet 263a of the rightmost fuel cartridge 260 in upper row by way of a communicating passage 269a formed in a communicating member 269. That is, the engine coolant supplied from the engine coolant supply passage 253 flows through the engine coolant passages 263 of the fuel cartridges 260 in the lower row, the communicating passage 269 and the engine coolant passages 263 of the fuel cartridges 260 in the upper row to the return passage 254. Further the hydrogen gas takeout ports 265 of the leftmost fuel cartridges 260 in the upper and lower rows are connected to the hydrogen gas supply passage 255 by way of a communicating member 270.

The connections between the respective parts are made by connectors 267 and 268 which are the same in structure as the connectors 227 and 228 described above.

With the arrangement described above, the engine coolant passages 263 in the respective fuel cartridges 260 in each of the upper and lower rows are connected in series, and the passages respectively formed by the engine coolant passages 263 in the fuel cartridges 260 in the upper and lower rows are connected in series by the communicating member 269. Accordingly, as in the second and third embodiments, the engine coolant is uniformly supplied to all the fuel cartridges 260 without stagnancy of the engine coolant which is apt to occur when the engine coolant passages 263 are connected in parallel to each other, whereby the hydrogen gas stored in the fuel cartridges 260 can be uniformly consumed.

Further since the outlet 263b of the engine coolant passage 263 of each fuel cartridge 260 is directly connected to the inlet 263a of the engine coolant passage 263 of another fuel cartridge 240 as in the second and third embodiment, the overall connection structure is simplified as compared with a case where the outlet 263b and the inlet 263a of the adjacent fuel cartridges are connected through a communicating member. At the same time, the number of the fuel cartridges 260 can be easily changed depending on the expected running distance and/or the expected running condition, whereby mounting ease and handling ease of the fuel cartridges 260 are improved.

Further since the hydrogen gas takeout port 265 and the connection port 266 of each fuel cartridge 260 are automatically opened and closed in response to connection and disconnection of the connectors 267 and 268, connection and disconnection of the hydrogen gas takeout port 265 and the connection port 266 can be effected very easily and very surely.

Though, in the second to fourth embodiments, not only the engine coolant passages but also the hydrogen gas takeout ports are connected in series, the hydrogen gas takeout ports of the respective fuel cartridges may be connected to the hydrogen gas supply passage in parallel to each other by way of branch passages. In such a case, by providing an on-off valve in each of the branch passages, hydrogen gas can be taken out from a desired one of the fuel cartridges.

In all the first to fourth embodiments described above, the engine coolant supply passage, the return passage and the engine coolant passages in the fuel cartridges are automatically closed when any one or more of the fuel cartridges is disconnected. Accordingly there is no possibility of engine coolant leaking out. This is especially advantageous when the engine coolant is used as heating medium for the hydrogen storage alloy.

For example, the vehicle provided with the hydrogen gas supply system of this embodiment can be replenished with hydrogen gas in the following manner.

Figure 29:
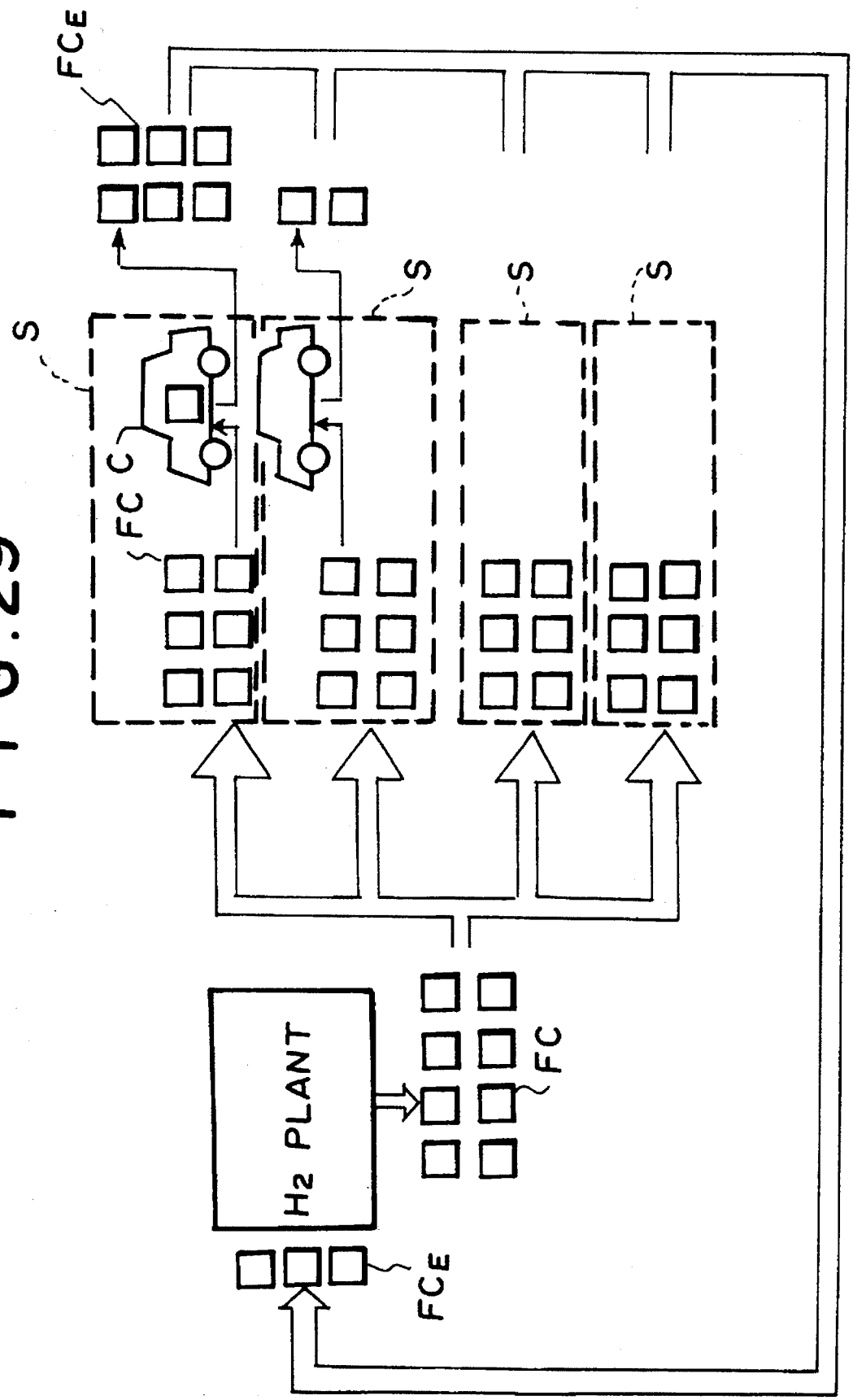
FIG. 29 is a schematic view showing the distribution of the fuel cartridges.

In FIG. 29, hydrogen gas produced in a hydrogen gas plant is stored in the hydrogen storage alloy in fuel cartridges FC, and the fuel cartridges FC filled with hydrogen gas are transported to filling stations S. Since the hydrogen gas stored in the hydrogen storage alloy cannot be discharged unless it is heated, the fuel cartridges FC can be handled in the same manner as general freight and can be transported without use of specialized facilities unlike the case where hydrogen gas is transported in the liquid state or the gas state. Further when stored in the hydrogen storage alloy, more hydrogen gas can be stored per volume as compared with the case where hydrogen gas is stored in the gas state. Thus the transportation cost is lowered and hydrogen gas can be supplied at lower cost.

At the filling station S, the hydrogen gas is stored as it is stored in the hydrogen storage alloy in the fuel cartridges FC without use of specialized facilities, which further reduces the cost. The vehicle C can be replenished with fuel, i.e., hydrogen gas, by simply replacing the exhausted fuel cartridges FC with new fuel cartridges FC full of hydrogen gas. Then the exhausted fuel cartridges $FC_E$ removed from the vehicle C are returned to the hydrogen gas plant and refilled with hydrogen gas. Since hydrogen gas can be stably stored in the fuel cartridges, even typical homes can store the fuel cartridges.

What is claimed is;

1. A hydrogen gas supply system for a hydrogen engine comprising a hydrogen gas cartridge having a casing in which hydrogen gas storage alloy and a heating medium passage for heating the hydrogen gas storage alloy are housed, a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned, characterized in that the hydrogen gas cartridge is provided with a hydrogen gas takeout port through which the hydrogen gas discharged from the hydrogen gas storage alloy is taken out, a heating medium inlet through which the heating medium supplied from the heating medium supply passage flows into the heating medium passage and a heating medium outlet through which the heating medium flowing into the heating medium passage flows out of the hydrogen gas cartridge, and the hydrogen gas cartridge is detachably attached to the engine with the hydrogen gas takeout port, the heating medium inlet and the heating medium outlet being respectively connected to and disconnected frown the hydrogen gas supply passage, the heating medium supply passage and the heating medium return passage in response to attachment and detachment of the hydrogen gas cartridge;

wherein a plurality of first joint portions are connected to said hydrogen gas supply in parallel to each other by way of branch passages, each of the first joint portions being adapted to be connected with the hydrogen gas takeout port of the hydrogen gas cartridge and a plurality of said hydrogen gas cartridges are attached to the engine with the hydrogen gas takeout port of each hydrogen gas cartridge connected to one of the first joint portions of the hydrogen gas supply passage.

2. A hydrogen gas supply system for a hydrogen engine comprising a hydrogen gas cartridge having a casing in which hydrogen gas storage alloy and a heating medium passage for heating the hydrogen gas storage alloy are housed, a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned, characterized in that the hydrogen gas cartridge is provided with a hydrogen gas takeout port through which the hydrogen gas discharged from the hydrogen gas storage alloy is taken out, a heating medium inlet through which the heating medium supplied from the heating medium supply passage flows into the heating medium passage and a heating medium outlet through which the heating medium flowing into the heating medium passage flows out of the hydrogen gas cartridge, and the hydrogen gas cartridge is attached to the engine with the hydrogen gas takeout port, the heating medium inlet and the heating medium outlet being respectively connected to the hydrogen gas supply passage, the heating medium supply passage and the heating medium return passage wherein a plurality of first joint portions are connected to said hydrogen gas supply passage in parallel to each other by way of branch passages, each of the first joint portions being adapted to be connected with the hydrogen gas takeout port of the hydrogen gas cartridge and a plurality of said hydrogen gas cartridges are attached to the engine with the hydrogen gas takeout port of each hydrogen gas cartridge connected to one of the first joint portions of the hydrogen gas supply passage; and said heating medium supply passage and the heating medium return passage are respectively provided with second and third joint portions and said hydrogen gas cartridges are arranged in a row while the heating medium inlet of the hydrogen gas cartridge at one end of the row is connected to the second joint portion, and the heating medium outlet of the hydrogen gas cartridge at the other end of the row is connected to the third joint portion with the heating medium inlet of each of the intermediate hydrogen gas cartridges being connected to the heating medium outlet of the hydrogen gas cartridge on the upstream side, whereby the heating medium passages in the respective hydrogen gas cartridges are connected in series between the heating medium supply passage and the heating medium return passage.

3. A hydrogen gas supply system as defined in claim 2 in which each of the first and second joint portions and the heating medium outlet of each hydrogen gas cartridge is provided with a first connector while each of the hydrogen gas takeout port and the heating medium inlet of each hydrogen gas cartridge and the third joint portion is provided with a second connector, the first and second connectors being respectively provided with valve means which are opened in response to connection of the first and second connectors and are closed in response to disconnection of the first and second connectors from each other.

4. A hydrogen gas supply system as defined in claim 2, wherein said hydrogen gas cartridge is detachably attached to the engine.

5. A hydrogen gas supply system for a hydrogen engine comprising a hydrogen gas cartridge having a casing in which hydrogen gas storage alloy and a heating medium passage for heating the hydrogen gas storage alloy are housed, a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned, wherein a plurality of valve means are provided in the respective passages, a first pressure sensor is provided in the hydrogen gas supply passage downstream of the valve means, a second pressure sensor is provided in each passage upstream of the valve, and a valve control means which determines the states of charge of the respective hydrogen gas cartridges on the basis the outputs of the second pressure sensors, and selectively opens one of the valve means to communicate the hydrogen gas supply passage with the hydrogen gas cartridge which corresponds to the valve means and is filled with a sufficient quantity of hydrogen gas while closing the valve means which has been opened when the pressure detected by the first pressure sensor is lower than a predetermined value;

wherein the hydrogen gas cartridge is provided with a hydrogen gas takeout port through which the hydrogen gas discharged from the hydrogen gas storage alloy is taken out, a heating medium inlet through which the heating medium supplied from the heating medium supply passage flows into the heating medium passage and a heating medium outlet through which the heating medium flowing into the heating medium passage flows out of the hydrogen gas cartridge, the hydrogen gas cartridge is attached to the engine with the hydrogen gas takeout port, the heating medium inlet and the heating medium outlet being respectively connected to the hydrogen gas supply passage, the heating medium supply passage and the heating medium return passage;

a plurality of first joint portions are connected to said hydrogen gas supply passage in parallel to each other by way of branch passages, each of the first joint portions being adapted to be connected with the hydrogen gas takeout port of the hydrogen gas cartridge and a plurality of said hydrogen gas cartridges are attached to the engine with the hydrogen gas takeout port of each hydrogen gas cartridge connected to one of the first joint portions of the hydrogen gas supply passage.

6. A hydrogen gas supply system as defined in claim 5 further comprising a fuel gauge which indicates the quantity of hydrogen gas remaining in the hydrogen gas cartridges attached to the engine on the basis of the outputs of the second pressure sensors.

7. A hydrogen gas supply system as defined in claim 6 in which said fuel gauge indicates the number of hydrogen gas cartridges filled with a sufficient quantity of hydrogen gas.

8. A hydrogen gas supply system as defined in claim 5, wherein said hydrogen gas cartridge is detachably attached to the engine.

9. A hydrogen gas supply system for a hydrogen engine comprising a hydrogen gas cartridge having a casing in which hydrogen gas storage alloy and a heating medium passage for heating the hydrogen gas storage alloy are housed, a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned, characterized in that the hydrogen gas cartridge is provided with a hydrogen gas takeout port through which the hydrogen gas discharged from the hydrogen gas storage alloy is taken out, a heating medium inlet through which the heating medium supplied from the heating medium supply passage flows into the heating medium passage and a heating medium outlet through which the heating medium flowing into the heating medium passage flows out of the hydrogen gas cartridge, the hydrogen gas cartridge is attached to the engine with the hydrogen gas takeout port, the heating medium inlet and the heating medium outlet being respectively connected to the hydrogen gas supply passage, the heating medium supply passage and the heating medium return passage the hydrogen gas supply passage, the heating medium supply passage and the heating medium return passage respectively provided with first to third joint portions and a plurality of said hydrogen gas cartridges are attached to the engine in a row, each hydrogen gas cartridge being further provided with a connection port which communicates with the hydrogen storage alloy and opens toward outside the casing, wherein the hydrogen gas takeout port and the heating medium inlet of the hydrogen gas cartridge at one end of the row are respectively connected to the first and second joint portions, the heating medium outlet of the hydrogen gas cartridge at the other end of the row is connected to the third joint portion, the hydrogen gas takeout port and the heating medium inlet of each of the intermediate hydrogen gas cartridges being respectively connected to the connection port and the heating medium outlet of the hydrogen gas cartridge on the upstream side, whereby the heating medium passages in the respective hydrogen gas cartridges are connected in series between the heating medium supply passage and the heating medium return passage and the hydrogen storage alloys in the respective hydrogen gas cartridges are connected to the hydrogen gas supply passage in series with each other.

10. A hydrogen gas supply system as defined in claim 9 in which each of the first and second joint portions, the connection port and the heating medium outlet is provided with a first connector while each of the hydrogen gas takeout port, the heating medium inlet, and the third joint portion is provided with a second connector, the first and second connectors being respectively provided with valve means which are opened in response to connection of the first and second connectors and are closed in response to disconnection of the first and second connectors from each other.

11. A hydrogen gas supply system as defined in claim 9, wherein said hydrogen gas cartridge is detachably attached to the engine.

12. A hydrogen gas supply system for a hydrogen engine comprising a hydrogen gas cartridge having a casing in which hydrogen gas storage alloy and a heating medium passage for heating the hydrogen gas storage alloy are housed, a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned, characterized in that the hydrogen gas cartridge is provided with a hydrogen gas takeout port through which the hydrogen gas discharged from the hydrogen gas storage alloy is taken out, a heating medium inlet through which the heating medium supplied from the heating medium supply passage flows into the heating medium passage and a heating medium outlet through which the heating medium flowing into the heating medium passage flows out of the hydrogen gas cartridge, the hydrogen gas cartridge is attached to the engine with the hydrogen gas takeout port, the heating medium inlet and the heating medium outlet being respectively connected to the hydrogen gas supply passage, the heating medium supply passage and the heating medium return passage the hydrogen gas supply passage, the heating medium supply passage and the heating medium return passage are respectively provided with first to third joint portions and a plurality of said hydrogen gas cartridges are attached to the engine in first and second rows, each hydrogen gas cartridge being further provided with a connection port which communicates with the hydrogen storage alloy and opens toward outside the casing, wherein the hydrogen gas takeout port of the hydrogen gas cartridge at one end of each row is connected to the first joint portion while the hydrogen gas takeout port of each of the intermediate hydrogen gas cartridges in each row is connected to the connection port of the hydrogen gas cartridge on the upstream side with the connection port of the hydrogen gas cartridge at the other end of each row closed, the heating medium inlet of the hydrogen gas cartridge at one end of the first rows is connected to said second joint portions while the heating medium outlet of the hydrogen gas cartridge at one end of the second row is connected to the third joint portion, the heating medium inlet of each of the intermediate hydrogen gas cartridges in each row being connected to the heating medium outlet of the hydrogen gas cartridge on the upstream side and the heating medium outlet of the hydrogen gas cartridge at the other end of the first row being connected to the heating medium inlet of the hydrogen gas cartridge at the other end of the first row being connected to the heating medium inlet of the hydrogen gas cartridge at the other end of the second row by way of a communicating passage, whereby the heating medium passages in the respective hydrogen gas cartridges in both the rows are connected in series between the heating medium supply passage and the heating medium return passage and the hydrogen storage alloys in the respective hydrogen gas cartridges in each row are connected to the hydrogen gas supply passage in series with each other.

13. A hydrogen gas supply system as defined in claim 12 in which each of the first and second joint portions, the connection port and the heating medium outlet is provided with a first connector while each of the hydrogen gas takeout port, the heating medium inlet and the third joint portion is provided with a second connector, the first and second connectors being respectively provided with valve means which are opened in response to connection of the first and second connectors and are closed in response to disconnection of the first and second connectors from each other.

14. A hydrogen gas supply system as defined in claim 12, wherein said hydrogen gas cartridge is detachably attached to the engine.

15. A hydrogen gas supply system for a hydrogen engine comprising a hydrogen gas cartridge having a casing in which hydrogen gas storage alloy and a heating medium passage for heating the hydrogen gas storage alloy are housed, a hydrogen gas supply passage which leads hydrogen gas discharged from the hydrogen gas cartridge to the engine, a heating medium supply passage which supplies heating medium to the heating medium passage in the hydrogen gas cartridge and a heating medium return passage through which the heating medium flows out of the hydrogen gas cartridge is returned, characterized in that the hydrogen gas cartridge is provided with a hydrogen gas takeout port through which the hydrogen gas discharged from the hydrogen gas storage alloy is taken out, a heating medium inlet through which the heating medium supplied from the heating medium supply passage flows into the heating medium passage and a heating medium outlet through which the heating medium flowing into the heating medium passage flows out of the hydrogen gas cartridge, the hydrogen gas cartridge is attached to the engine with the hydrogen gas takeout port, the heating medium inlet and the heating medium outlet being respectively connected to the hydrogen gas supply passage, the heating medium supply passage and the heating medium return passage the hydrogen gas supply passage, the heating medium supply passage and the heating medium return passage are respectively provided with first to third joint portions and a plurality of said hydrogen gas cartridges are attached to the engine in a row, each hydrogen gas cartridge being further provided with a connection port which communicates with the hydrogen storage alloy and opens toward outside the casing and the heating medium passage of each hydrogen gas cartridge comprising first and second heating medium passages each having heating medium inlet and outlet, wherein the hydrogen gas takeout port of the hydrogen gas cartridge at one end of the row is connected to the first joint portion while the hydrogen gas takeout port of each of the intermediate hydrogen gas cartridges in the row is connected to the connection port of the hydrogen gas cartridge on the upstream side with the connection port of the hydrogen gas cartridge at the other end of each row closed, and the heating medium inlet of the first heating medium passage of the hydrogen gas cartridge at one end of the row is connected to said second joint portion while the heating medium outlet of the second heating medium passage of the hydrogen gas cartridge at said one end of the row is connected to the third joint portion, the heating medium inlet of the first heating medium passage of each of the intermediate hydrogen gas cartridges in the row being connected to the heating medium outlet of the first heating medium passage of the hydrogen gas cartridge on the side nearer to said one end of the row, the heating medium outlet of the second heating medium passage of each of the intermediate hydrogen gas cartridges in the row being connected to the heating medium inlet of the second heating medium passage of the hydrogen gas cartridge on the side nearer to said one end of the row and the heating medium outlet of the first heating medium passage of the hydrogen gas cartridge at the other end of the row being connected to the heating medium inlet of the second heating medium passage thereof by way of a communicating passage.

16. A hydrogen gas supply system as defined in claim 15 in which each of the first and second joint portions, the connection port and the heating medium outlet is provided with a first connector while each of the hydrogen gas takeout port, the heating medium inlet and the third joint portion is provided with a second connector, the first and second connectors being respectively provided with valve means which are opened in response to connection of the first and second connectors and are closed in response to disconnection of the first and second connectors from each other.

17. A hydrogen gas supply system as defined in claim 15, wherein said hydrogen gas cartridge is detachably attached to the engine.

18. A hydrogen gas supply system for a hydrogen engine comprising a hydrogen gas cartridge having a casing in which a hydrogen gas storage alloy is housed, a hydrogen gas supply passage which leads hydrogen gas discharged from the hydrogen gas cartridge to the engine, characterized in that the hydrogen gas cartridge is provided with a hydrogen gas takeout port through which the hydrogen gas discharged from the hydrogen gas storage alloy is taken out, and the hydrogen gas cartridge is detachably attached to the engine with the hydrogen gas takeout port, being connected to and disconnected from the hydrogen gas supply passage, wherein a plurality of first joint portions are connected to said hydrogen gas supply in parallel to each other by way of branch passages, each of the first joint portions being adapted to be connected with the hydrogen gas takeout port of the hydrogen gas cartridge and a plurality of said hydrogen gas cartridges are attached to the engine with the hydrogen gas takeout port of each hydrogen gas cartridge connected to one of the first joint portions of the hydrogen gas supply passage.

19. A hydrogen gas supply system for a hydrogen engine comprising a hydrogen gas cartridge having a casing in which a hydrogen gas storage alloy is housed, a hydrogen gas supply passage which leads hydrogen gas discharged from the hydrogen gas cartridge to the engine, a plurality of first joint portions are connected to said hydrogen gas supply passage in parallel to each other by way of branch passages, each of the first joint portions being adapted to be connected with the hydrogen gas takeout port of the hydrogen gas cartridge and a plurality of said hydrogen gas cartridges are attached to the engine with the hydrogen gas takeout port of each hydrogen gas cartridge connected to one of the first joint portions of the hydrogen gas supply passage, wherein a plurality of valve means are provided in the respective branch passages, a first pressure sensor provided in the hydrogen gas supply passage downstream of the valve means, a second pressure sensor provided in each branch passage upstream of the valve, and a valve control means for determining the state of charge of the respective hydrogen gas cartridges on the basis of the outputs of the second pressure sensors, and for selectively opening one of the valve means to communicate the hydrogen gas supply passage with the hydrogen gas cartridge which corresponds to the valve means and is filled with a sufficient quantity of hydrogen gas while closing the valve means which has been opened when the pressure detected by the first pressure sensor is lower than a predetermined value;

wherein the hydrogen gas cartridge is provided with a hydrogen gas takeout port through which the hydrogen gas discharged from the hydrogen gas storage alloy is taken out, and the hydrogen gas cartridge is attached to the engine with the hydrogen gas takeout port being connected to the hydrogen gas supply passage.

20. A hydrogen gas supply system as defined in claim 19 further comprising a fuel gauge which indicates the quantity of hydrogen gas remaining in the hydrogen gas cartridges attached to the engine on the basis of the outputs of the second pressure sensors.

21. A hydrogen gas supply system as defined in claim 19, wherein said hydrogen gas cartridge is detachably attached to the engine.

22. A hydrogen gas supply system for a hydrogen engine comprising a hydrogen gas cartridge having a casing in which a hydrogen gas storage alloy is housed, a hydrogen gas supply passage which leads hydrogen gas discharged from the hydrogen gas cartridge to the engine, characterized in that the hydrogen gas cartridge is provided with a hydrogen gas takeout port through which the hydrogen gas discharged from the hydrogen gas storage alloy is taken out, the hydrogen gas cartridge is attached to the engine with the hydrogen gas takeout port being connected to the hydrogen gas supply passage, the hydrogen gas supply passage is provided with first joint portions and a plurality of said hydrogen gas cartridges are attached to the engine in a row, each hydrogen gas cartridge being further provided with a connection port which communicates with the hydrogen storage alloy and opens toward outside the casing, wherein the hydrogen gas takeout port at one end of the row is connected to the first joint portion, and the hydrogen gas takeout port of each of the intermediate hydrogen gas cartridges being connected to the connection port of the hydrogen gas cartridge on the upstream side, whereby the hydrogen storage alloys in the respective hydrogen gas cartridges are connected to the hydrogen gas supply passage in series with each other.

23. A hydrogen gas supply system as defined in claim 22, wherein said hydrogen gas cartridge is detachably attached to the engine.

* * * * *